United States Patent  (10) Patent No.: US 10,330,979 B2
Ryu et al.  (45) Date of Patent: Jun. 25, 2019

(54) LED DISPLAY DEVICE AND STRUCTURE OF ASSEMBLING THE SAME

(71) Applicant: SAMSUNG ELECTRONICS CO., LTD., Suwon-si (KR)

(72) Inventors: Chang Won Ryu, Suwon-si (KR); Nguyenhuulam Vuong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/606,772

(22) Filed: May 26, 2017

(65) Prior Publication Data

US 2018/0031919 A1  Feb. 1, 2018

(30) Foreign Application Priority Data

Jul. 26, 2016 (KR) ........................ 10-2016-0094628

(51) Int. Cl.
*G02F 1/1335* (2006.01)
*H01B 3/00* (2006.01)
(Continued)

(52) U.S. Cl.
CPC .. *G02F 1/133603* (2013.01); *G02F 1/133608* (2013.01); *G09F 9/3026* (2013.01); *G09F 9/33* (2013.01); *G09G 3/32* (2013.01); *G09G 5/04* (2013.01); *H01B 3/006* (2013.01); *H01F 7/0221* (2013.01); *H01F 7/0252* (2013.01); (Continued)

(58) Field of Classification Search
CPC ......... G02F 1/133603; G02F 1/133608; H01F 7/0252; H01F 7/0221; G09F 9/33; G09F 9/3026; H01B 3/006; G09G 3/32; G09G 5/04; G09G 2300/026; G09G 2300/0452
See application file for complete search history.

(56) References Cited

U.S. PATENT DOCUMENTS 3,744,833 A  7/1973  Berducone
4,380,162 A  4/1983  Woolfson
(Continued)

FOREIGN PATENT DOCUMENTS

CN  201655913 U  11/2010
CN  204178650 U  2/2015
(Continued)

OTHER PUBLICATIONS

ISR, written opnion, dated Sep. 2017.*
(Continued)

*Primary Examiner* — Tracie Y Green
(74) *Attorney, Agent, or Firm* — Sughrue Mion, PLLC

(57) ABSTRACT

A display device includes a LED module including: a circuit board; a plurality of LEDs mounted on the circuit board; and at least one first fastening member provided on a first face of the circuit board, the at least one first fastening member being magnetized to one of a N-pole and a S-pole; and a bracket configured to accommodate the LED module therein and comprising at least one second fastening member, the at least one first fastening member and the at least one second fastening member being fastened by magnetic force. The second fastening member includes a first magnet configured to move linearly based on a polarity of the at least one first fastening member.

16 Claims, 15 Drawing Sheets

(51) Int. Cl.
  *H01F 7/02*  (2006.01)
  *G09G 3/32*  (2016.01)
  *G09G 5/04*  (2006.01)
  *G09F 9/302* (2006.01)
  *G09F 9/33*  (2006.01)

(52) U.S. Cl.
  CPC .............. *G09G 2300/026* (2013.01); *G09G 2300/0452* (2013.01)

(56) References Cited

U.S. PATENT DOCUMENTS

| | | | |
|---|---|---|---|
| 5,188,405 | A | 2/1993 | Maccaferri |
| 5,949,581 | A | 9/1999 | Kurtenbach et al. |
| 2008/0232061 | A1 | 9/2008 | Wang et al. |
| 2011/0216485 | A1 | 9/2011 | Kang et al. |
| 2013/0086797 | A1 | 4/2013 | Davis et al. |
| 2014/0003052 | A1 | 1/2014 | Hemiller et al. |
| 2014/0078685 | A1 | 3/2014 | Lee et al. |
| 2014/0091686 | A1 | 4/2014 | Pegg et al. |
| 2016/0165745 | A1 | 6/2016 | Choi et al. |

FOREIGN PATENT DOCUMENTS

| | | |
|---|---|---|
| KR | 20-2010-0010932 U | 11/2010 |
| KR | 200464801 Y1 | 2/2013 |
| KR | 101452110 B1 | 10/2014 |
| KR | 101541402 B1 | 8/2015 |
| WO | 2010125383 A1 | 11/2010 |
| WO | 2016/065862 A1 | 5/2016 |

OTHER PUBLICATIONS

Communication dated Feb. 8, 2018, issued by the European Patent Office in counterpart European application No. 16814631.4.
Office Action dated Mar. 9, 2018, issued by the United States Patent and Trademark Office in U.S. Appl. No. 15/192,295.
International Search Report (PCT/ISA/210) dated Sep. 30, 2016 issued by the International Searching Authority in counterpart International Application No. PCT/KR2016/006511.
Office Action dated Sep. 21, 2017, issued by the United States Patent Office in U.S. Appl. No. 15/192,295.
Office Action dated Aug. 1, 2018, issued by the U.S. Patent and Trademark Office in U.S. Appl. No. 15/192,295.
International Search Report, dated Sep. 8, 2017 by the International Searching Authority in International Application No. PCT/KR2017/005576. (PCT/ISA/210).
Advisory Action dated Dec. 31, 2018, issued by the U.S. Patent and Trademark Office in U.S. Appl. No. 15/192,295.
Office Action dated Feb. 8, 2019, issued by the U.S. Patent and Trademark Office in U.S. Appl. No. 15/192,295.

* cited by examiner

LED DISPLAY DEVICE AND STRUCTURE OF ASSEMBLING THE SAME

CROSS-REFERENCE TO RELATED APPLICATION

This application claims priority from Korean Patent Application No. 10-2016-0094628, filed on Jul. 26, 2016, the disclosure of which is incorporated herein by reference in its entirety.

BACKGROUND

1. Field

Exemplary embodiments of the disclosure relate to a light emitting diode (LED) display device and an assembly structure for assembling the same, and more particularly, to an LED display device and an assembly structure for assembling the same where the assembly structure is able to attach/detach an LED module using magnetic force.

2. Discussion of Related Art

An LED display device including a plurality of LEDs has excellent brightness and color characteristics compared with other types of display devices (e.g., a liquid crystal display (LCD) device), and is thus often used for indoor/outdoor billboards, indoor/outdoor signboards in sports stadiums, electronic scoreboards, or indoor/outdoor backdrops. Further, the LED display device may be easily extended in viewing size by arranging the plurality of LEDs in the form of M×N (M, N are integers) matrix.

With increasing demands for a large indoor or outdoor LED display device implemented in the form of the M×N matrix, there is an increasing need for a LED display device which offers easy transferability and easy installation.

SUMMARY

In accordance with an aspect of an exemplary embodiment, there is provided a light emitting diode (LED) display device including: an LED module configured to have a plurality of LEDs, a circuit board with the plurality of LEDs mounted thereon, and a first fastening member located on the rear face of the circuit board and magnetized to one of N- and S-poles by external magnetic force; and a front bracket configured to support the LED module and include a second fastening member combined by magnetic force at a location corresponding to the first fastening member. The second fastening member may include a first magnet configured to be linearly moved according to a polarity of the first fastening member.

The first fastening members may be located in corner areas on the rear face of the LED module, and the number of the first fastening members may be greater than that of corners of the LED module.

The LED module may further include a guide member for guiding the LED module in a fastening direction, and the guide member may do not overlap the first fastening member.

The second fastening member may include a magnet and a screw cap, and the second fastening member may be fixed in a groove formed in the bottom of the front bracket.

The first magnet is movable linearly in the screw cap.

In accordance with an aspect of another exemplary embodiment, a light emitting diode (LED) display device including: an LED module configured to have a circuit board with a plurality of LEDs mounted thereon in the form of a matrix and a first fastening member magnetized to one of N- and S-poles by external magnetic force; a front bracket configured to support a plurality of the LED modules arranged in the form of a matrix, and have a second fastening member combined with the first fastening member by magnetic force and have a magnet movable linearly by magnetic force of the first fastening member; and a cover frame combined with the front bracket. The cover frame receives one of a control board may be configured to provide a driving signal to drive the LEDs and a power supply configured to supply power to the LED.

In accordance with an aspect of another exemplary embodiment, there is provided a display device includes LED module including: a circuit board; a plurality of LEDs mounted on the circuit board; and at least one first fastening member provided on a first face of the circuit board, the at least one first fastening member being magnetized to one of a N-pole and a S-pole; and a bracket configured to accommodate the LED module therein and comprising at least one second fastening member, the at least one first fastening member and the at least one second fastening member being fastened by magnetic force. The second fastening member includes a first magnet configured to move linearly based on a polarity of the at least one first fastening member.

In accordance with an aspect of another exemplary embodiment, there is provided a display device may including: an LED module including: a circuit board with a plurality of LEDs mounted thereon in a matrix form; and at least one first fastening member magnetized to one of N- and S-poles by external magnetic force; a bracket configured to accommodate a plurality of the LED modules arranged in a matrix form, and comprising at least one second fastening member being fastened with the at least one first fastening member by magnetic force, the at least one second fastening member comprising a magnet movable linearly based on magnetic force of the at least one first fastening member; and a cover frame combined with the bracket. The cover frame is configured to accommodate one of a control board configured to provide a driving signal to drive the LEDs and a power supply configured to supply power to an LED of the plurality of LEDs.

In accordance with an aspect of another exemplary embodiment, there is provided an assembly structure configured to magnetize a first member of an LED module to one of a N-pole and a S-pole thereby attaching/detaching the LED module to/from a bracket including a second member by magnetic force between the first member and the second member, the assembly structure including: a plate having a plurality of openings; a magnet located on a surface of the plate for magnetizing the first member to fasten the first member and the second member; and a shock absorbing member located around the second magnet for absorbing shocks.

In accordance with an aspect of another exemplary embodiment, there is provided a display device may including: an LED module comprising a plurality of first fastening members provided on a rear face of the LED module, the plurality of first fastening members being magnetized to one of N- and S-poles by external magnetic force; and a bracket configured to accommodate the LED module therein, the bracket comprising a plurality of second fastening members provided on a front face of the bracket at locations corresponding to locations of the plurality of first fastening members provided on the LED module. The LED module and the bracket are fastened by magnetic force between the plurality of first fastening members and the plurality of second fastening members.

BRIEF DESCRIPTION OF THE DRAWINGS

The above and/or other aspects will become more apparent by describing in detail exemplary embodiments with reference to the accompanying drawings, in which.

DETAILED DESCRIPTION OF EXEMPLARY EMBODIMENTS

Figure 1:
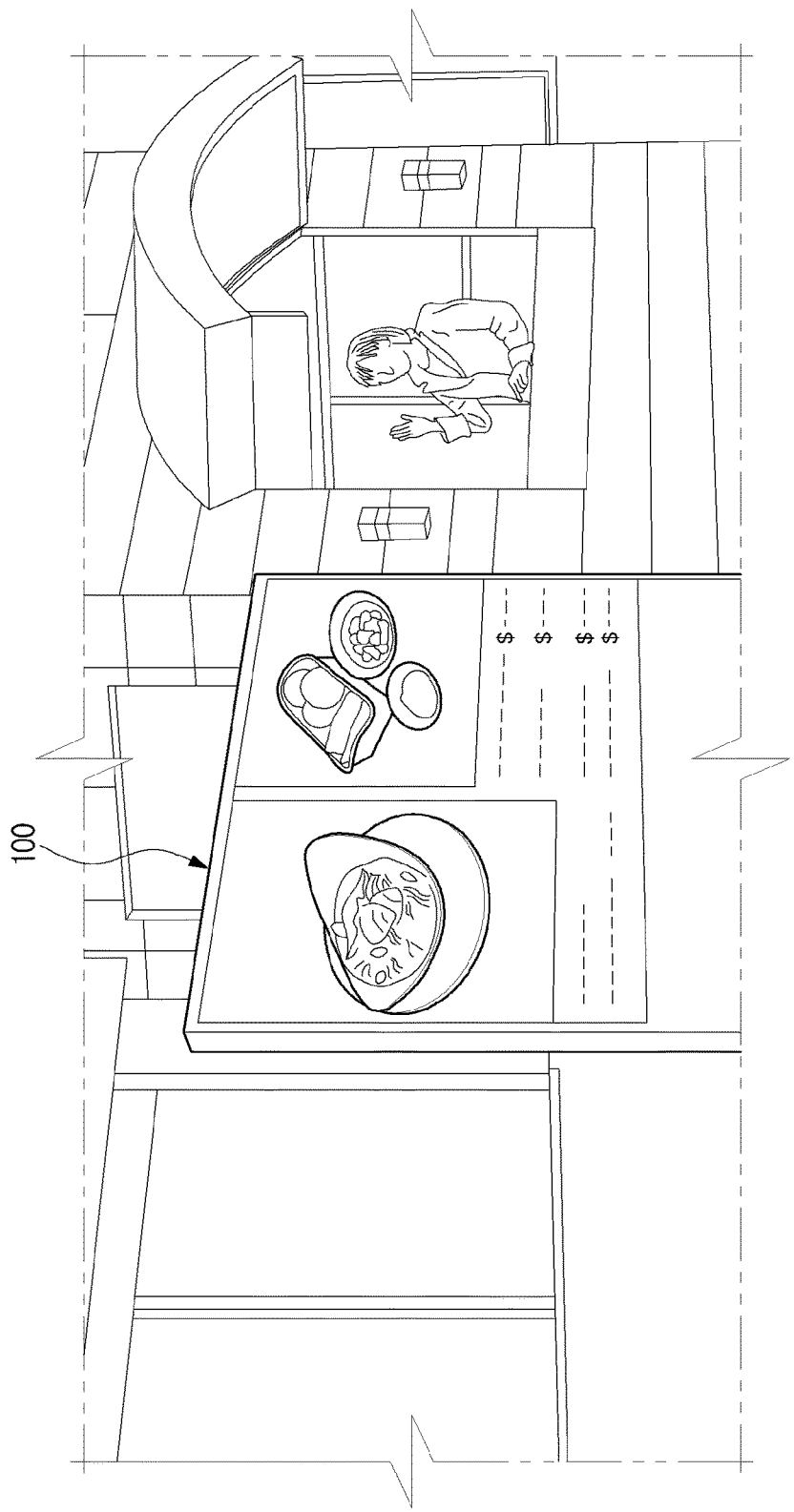
FIG. 1 schematically shows an LED display device, according to an exemplary embodiment.

Exemplary embodiments will now be described more fully with reference to the accompanying drawings, in which exemplary embodiments are shown. Methods for manufacturing and using the exemplary embodiments of the present disclosure will also be described in detail below with reference to the accompanying drawings. Throughout the drawings, like reference numerals refer to like parts or components.

It will be understood that, although the terms first, second, third, etc., may be used herein to describe various components, these components should not be limited by these terms. These terms are only used to distinguish one component from another. For example, a first component may also be called a second component, while the second component may be called a first component.

Descriptions shall be understood as to include any and all combinations of one or more of the associated listed items when the items are described by using the conjunctive term "~ and/or ~," or the like. Furthermore, the terms "film", "sheet", and "plate" may be interchangeably used.

Content may be displayed on a display device. The content may be received from a control device connected to the display device and/or another display device connected. The content may also be received from an external server. The content may include a video files or audio file played by an application, e.g., a video player, a music file played by a music player, a photo file presented in a photo gallery, a web page file presented by a web browser, a text file, or the like. The content may also include broadcasting content.

The terminology used herein is for the purpose of describing particular embodiments only and is not intended to limit the present disclosure. It is to be understood that the singular forms "a," "an," and "the" include plural references unless the context clearly dictates otherwise.

It will be further understood that the terms "comprises," "comprising," "includes," and "including" when used in this specification, specify the presence of stated features, integers, steps, operations, elements, and/or components, but do not preclude the presence or addition of one or more other features, integers, steps, operations, elements, components, and/or groups thereof. Like reference numerals in the drawings denote like elements, and thus their description will be omitted.

FIG. 1 schematically shows an LED display device 100 installed outdoors, according to an exemplary embodiment.

Figure 2A:
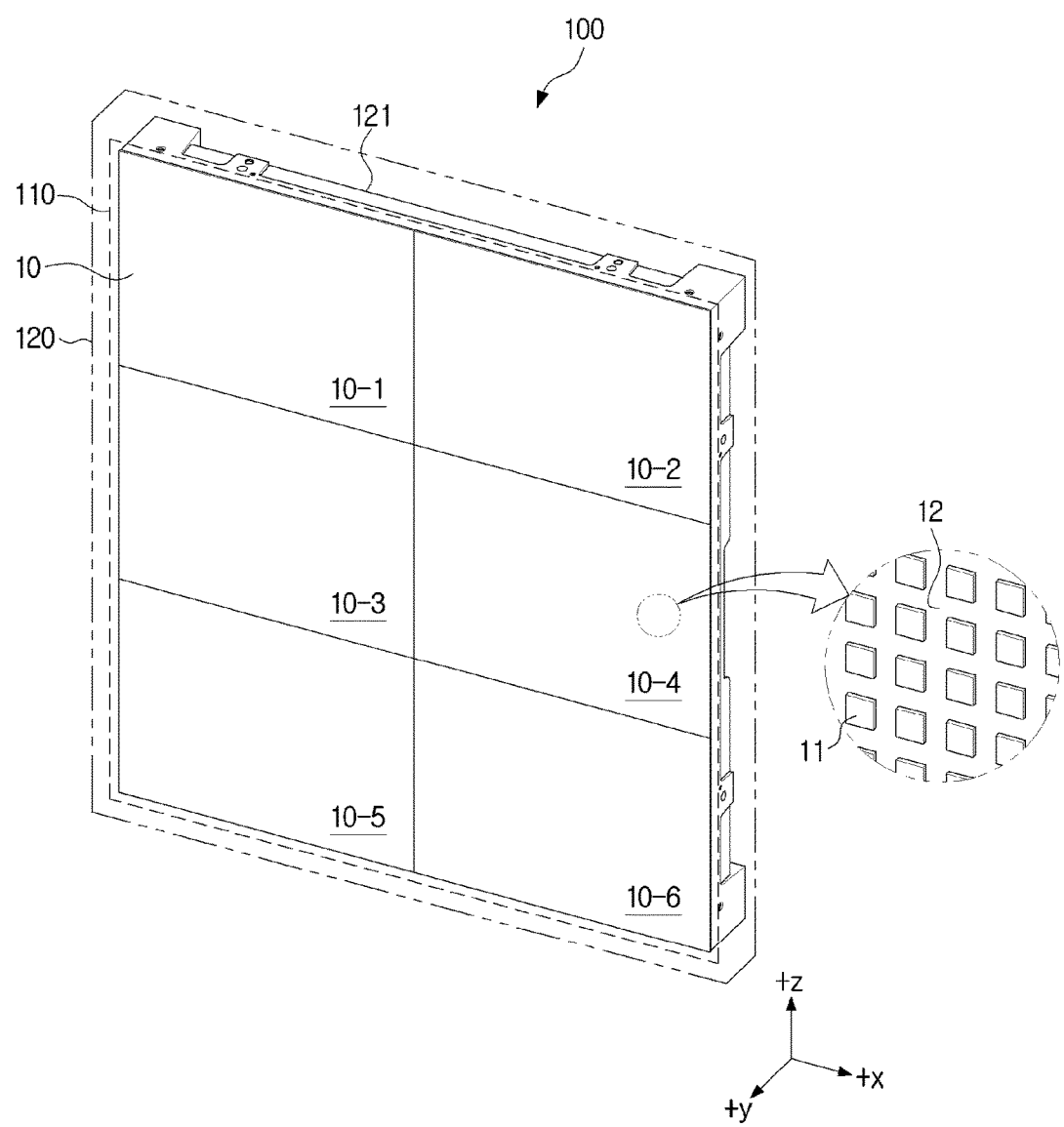
FIG. 2A is a schematic front perspective view of an LED display device, according to an exemplary embodiment.

FIG. 2A is a schematic front perspective view of an LED display device 100, according to an exemplary embodiment.

Figure 2B:
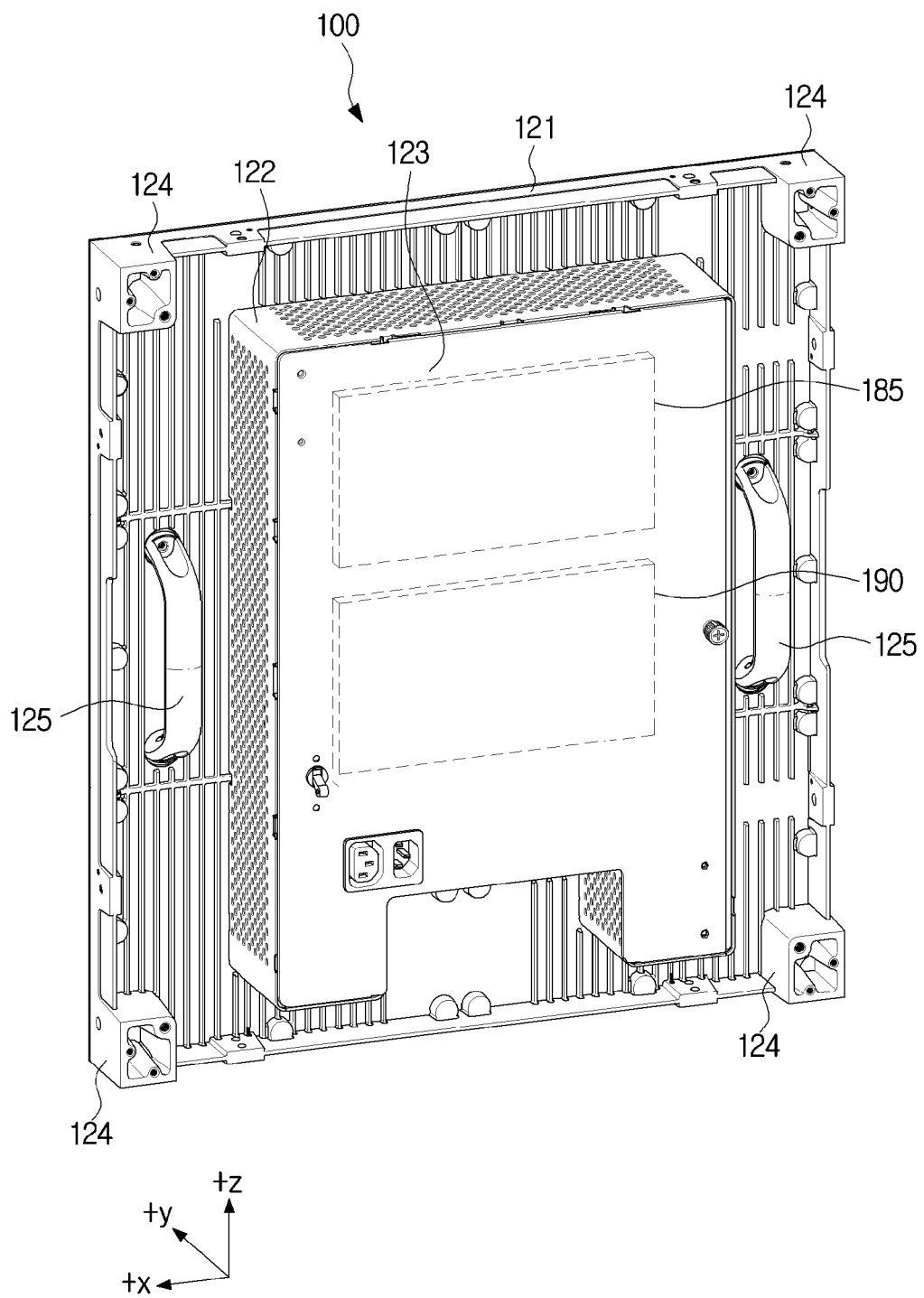
FIG. 2B is a schematic rear perspective view of an LED display device, according to an exemplary embodiment.

FIG. 2B is a schematic rear perspective view of an LED display device 100, according to an exemplary embodiment.

Figure 3:
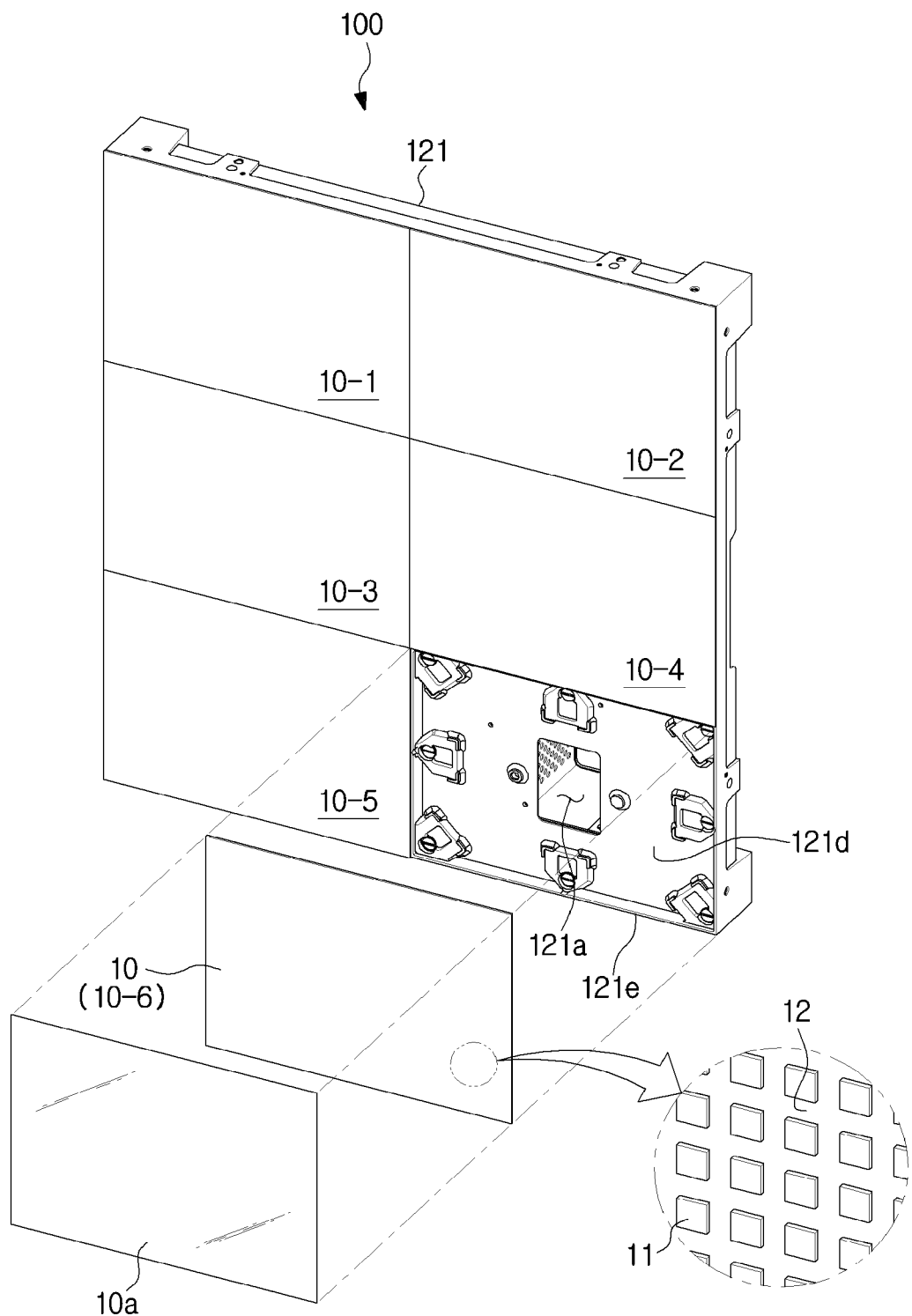
FIG. 3 shows a schematic exploded view of an LED display device and an enlarged view of a part of the LED display device, according to an exemplary embodiment.

FIG. 3 shows a schematic exploded view of an LED display device and an enlarged view of a part of the LED display device, according to an exemplary embodiment.

Figure 4:
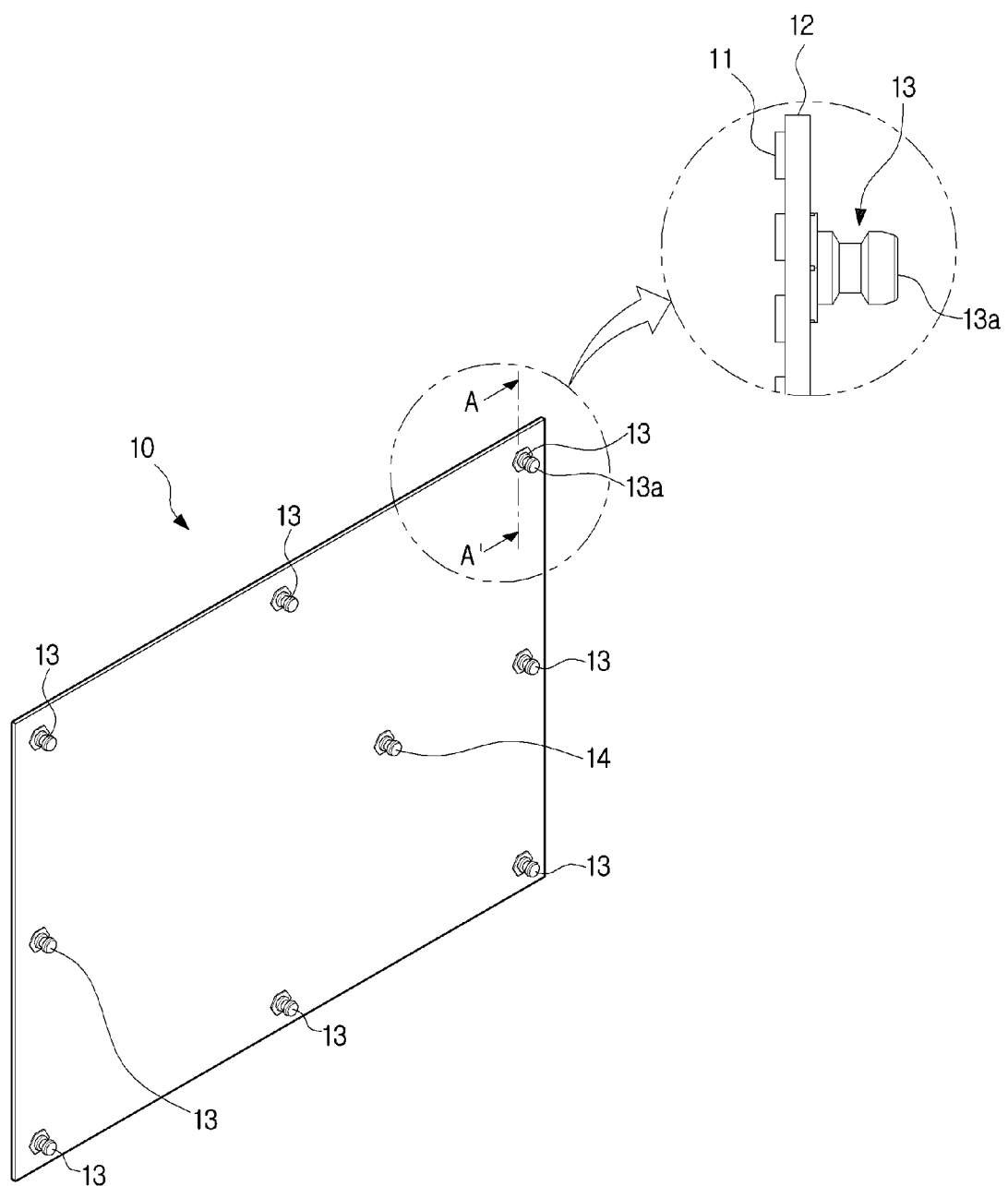
FIG. 4 shows a schematic cross-sectional view and schematic perspective view of a first fastening member of an LED display device, according to an exemplary embodiment.

FIG. 4 shows a schematic cross-sectional view and schematic perspective view of the back face of an LED module, according to an exemplary embodiment.

Referring to FIG. 1, an LED display device 100 installed outdoors. However, the exemplary embodiment is not limited thereto. For example, the LED display device 100 may be installed indoors.

In FIG. 1, the LED display device 100 installed outdoors (or indoors) may be provided for the user as a billboard to display products and/or prices thereof.

The LED display device 100 may be implemented by arranging LEDs emitting red, green, and blue light in the form of a matrix.

The LED display device 100 may be implemented by packaging red, green and blue LEDs in a pixel and arranging a plurality of pixels in the form of a matrix. The red, green, and blue LEDs constituting one pixel may be called a sub pixel. Alternatively, the LED display device 100 may be implemented with LEDs emitting light in white color and including color filters for filtering the white light of the LEDs into various colors.

The LED display device 100 may include a plurality of LEDs 11 (see FIG. 2A) to form a screen as shown in FIG. 2A. The LED display device 100 may display content by driving the plurality of LEDs 11.

The LED display device 100 may provide clear visibility for the user with high brightness (e.g., 2,500 nit). The LED display device 100 may also be waterproof and/or dustproof. The waterproof and/or dustproof capability supported by the LED display device 100 may be determined by referring to an Ingress Protection rating.

Taking into account provided information (e.g., an advertisement), a distance to the user and/or the user's eye level, the LED display device 100 may be fixed to the wall by a wall-mount unit or supported by a stand. Alternatively, the LED display device 100 may be fixed on the bottom of a furrow of a wall.

The LED display device 100 may include a plurality of LED modules 10 (see FIG. 2A) for displaying content with the plurality of LEDs 11 provided inside each LED module 10. The LED display device 100 may further include a timing controller for supplying a driving signal to the LED 11, and a power supply (SMPS, 190) for supplying power.

The LED display device 100 may further include a front bracket 121 for supporting the plurality of LED modules 10, a cover frame 122 for accommodating the timing controller 185 and SMPS 190, a cover 123 and a handle 125 as shown in FIG. 2B.

The plurality of LEDs 11, the LED module 10, the front bracket 121, the timing controller 185, the SMPS 190, the cover frame 122, the cover 123 and the handle 125 are collectively called a cabinet 120 (FIG. 2A). The LED display device 100 may refer to a single LED cabinet or a plurality of LED cabinets. Furthermore, a single LED module 10 or a matrix of LED modules 10 may be called an LED panel 110.

Although the LED display device 100 includes LED modules 10 arranged in 2×3 matrix in FIG. 2A (i.e., including the LED modules 10-1, 10-2, 10-3, 10-4, 10-5 and 10-6 in FIG. 2A), it will be obvious to ordinary skilled in the art that the LED module 10 (the LED modules 10-1, 10-2, 10-3, 10-4, 10-5 and 10-6) in the matrix may be modified in various numbers and arrangement patterns.

The LED display device 100 and an assembly structure for assembling the LED display device 100 will now be described in detail.

The LED display device 100 may be implemented as a curved LED display device having a screen with a fixed (or single) curvature, (e.g., 2500R), a curved LED display device having a screen with multiple curvatures (e.g., a first curvature of 2500R and a second curvature of 3000R continued from the first curvature), or a bendable LED display with a bendable screen that may be changed from one curvature to another by user input.

An external control device may be connected onto one side (or one side of the cabinet 120) of the LED display device 100 via a cable. Alternatively, the LED display device 100 may be connected to the external control device through a communication unit by wireless communication.

In the case that the LED display device 100 connected to the control device by the cable is fixed to a wall by a wall mount unit, the control device may be placed between the back of the LED display device 100 and the wall.

The components included in the LED display device 100 may be modified in size and/or shape. It will be apparent to ordinary skilled in the art that the components of the LED display device 100 may be modified in size and/or shape.

Referring to FIGS. 2A and 2B, the LED display device 100 may include the plurality of LEDs 11, the LED module 10 having a circuit board 12 with the plurality of LEDs 11 mounted thereon, the LED panel 110 having one or multiple LED modules 10 arranged in the form of a matrix, and the LED cabinet 120 for supporting the one or multiple LED panels 110 having one or multiple LED modules 10.

As for the LEDs 11, a pixel is implemented with sub pixels: red, green, and blue LEDs, and such a pixel may be repeatedly/cyclically arranged. For example, referring to FIG. 2A, red LEDs each implemented as a sub pixel may be aligned in the direction of gravity (e.g., along −z axis). Green LEDs may be aligned in the same line to the right side of the red LEDs along the gravity direction. Furthermore, blue LEDs 11 may be aligned in the same line to the right side of the green LEDs along the gravity direction.

The plurality of LEDs 11 may be mounted on the circuit board 12 in the form of a matrix (e.g., M×N, where M and N are integers). The matrix may be a square matrix (e.g., 16×16 matrix, 24×24 matrix, etc., i.e., M=N, where M and N are integers), or a rectangular matrix (i.e., M≠N).

The circuit board 12 may have a triangular, rectangular, or circular (including elliptical) form based on an overall shape of the LED display device 100. Corresponding to the shape of the circuit board 12, the LED module 10 may have a triangular, rectangular, polygonal or circular (including elliptical) shape.

Resolution (or arrangement) of the LED display device 100 may vary depending on the pitch between LEDs 11 in the same size of the LED module 10. For example, if the pitch between the LEDs 11 is 2.5 mm, the arrangement of the LED module 10 with 16:9 full high density (FHD) resolution may be 10×5. In another example, if the pitch between the LEDs 11 is 2.0 mm, the arrangement of the LED module 10 with FHD resolution may be 8×4.

As not only for the FHD but also for quad high density (QHD) or ultrahigh density (UHD), it will be apparently understood by the ordinary skilled in the art that the resolution (or arrangement) of the LED display device 100 may vary depending on the same sized pitch between the LEDs 11 of the LED module 10.

The LEDs 11 corresponding to a pixel may be driven (e.g., turning on, turning off, or flickering) by a driving signal sent from the timing controller 185.

The LED panel 110 is a set of LED modules 10 (10-1 to 10-6) arranged in the form of a matrix. For example, the LED panel 110 may include the single LED module 10-1 or a plurality of LED modules (six modules) 10-1 to 10-6 arranged in the form of a matrix (M×N, where M and N are integers).

The rear face of the LED panel (or the LED module) facing the opposite direction of light emission may be supported by the front bracket 121 of the LED cabinet 120 to cross the gravity direction (e.g., along the −z axis) or supported in the gravity direction. The front bracket 121 may also be referred to as an assembly bracket.

The back of the LED panel 110 (or the LED module 10) may be attached to or detached from the front bracket 121 of the LED cabinet 120 by magnetic force. Furthermore, a first fastening member 13 (FIG. 4) located on a back face of the LED panel 110 (or LED module 10) may be attached to or detached from the front bracket 121 by being magnetized by external magnetic force. Attachment/detachment of the LED module 10 to/from the front bracket 121 will be described below.

The LED cabinet 120 may include the front bracket 121, the cover frame 122 attached to the front bracket 121, and the cover 123. The LED cabinet 120 may include linkages 124. The LED cabinet 120 may further include one or more handles 125.

Referring to FIG. 3, the front bracket 121 may support the LED panel 110 (or the LED module 10) and may have an opening 121a. The front bracket 121 may include a material like aluminum or aluminum alloy. The front bracket 121 may also include a paramagnetic material (or alloy). The front bracket 121 may also include a non-magnetic metal (or alloy).

Driving signals and/or power may be delivered to the LED module 10 (or the LED panel 110) through the opening 121a. The assembly bracket (or base plate 121) may be equal to or larger in area than the plurality of LED modules 10. Alternatively, the front bracket 121 may be smaller in area than the plurality of LED modules 10 depending on the structure of attachment or detachment of the front bracket 121 and the LED module 10.

In a case that the LED display device 100 is implemented in a single LED panel 110, the front bracket 121 may be equal to or larger in area than a single LED panel 110. Alternatively, the front bracket 121 may be smaller in area than a single LED module 10 depending on the structure of attachment or detachment of the front bracket 121 and the LED module 10.

The cover frame 122 may receive some of the components of the LED display device 100 in the back face of the front bracket 121 (e.g., along the −y axis). For example, the cover frame 122 may accommodate all or one of the timing controller 185 for providing driving signals to control the LEDs 11 and the SMPS 190 for supplying power to the LED panel 110. The cover frame 122 may further accommodate a main board to control the timing controller 185 and the SMPS 190.

The timing controller 185 may send LED driving control signals to the respective LEDs 11 according to a video (or image) received from the control device. The timing controller 185 may be connected to an external control device via a cable through an opening of the cover frame 122.

The cover 123 may open or close the back face of the cover frame 122.

Figure 13:
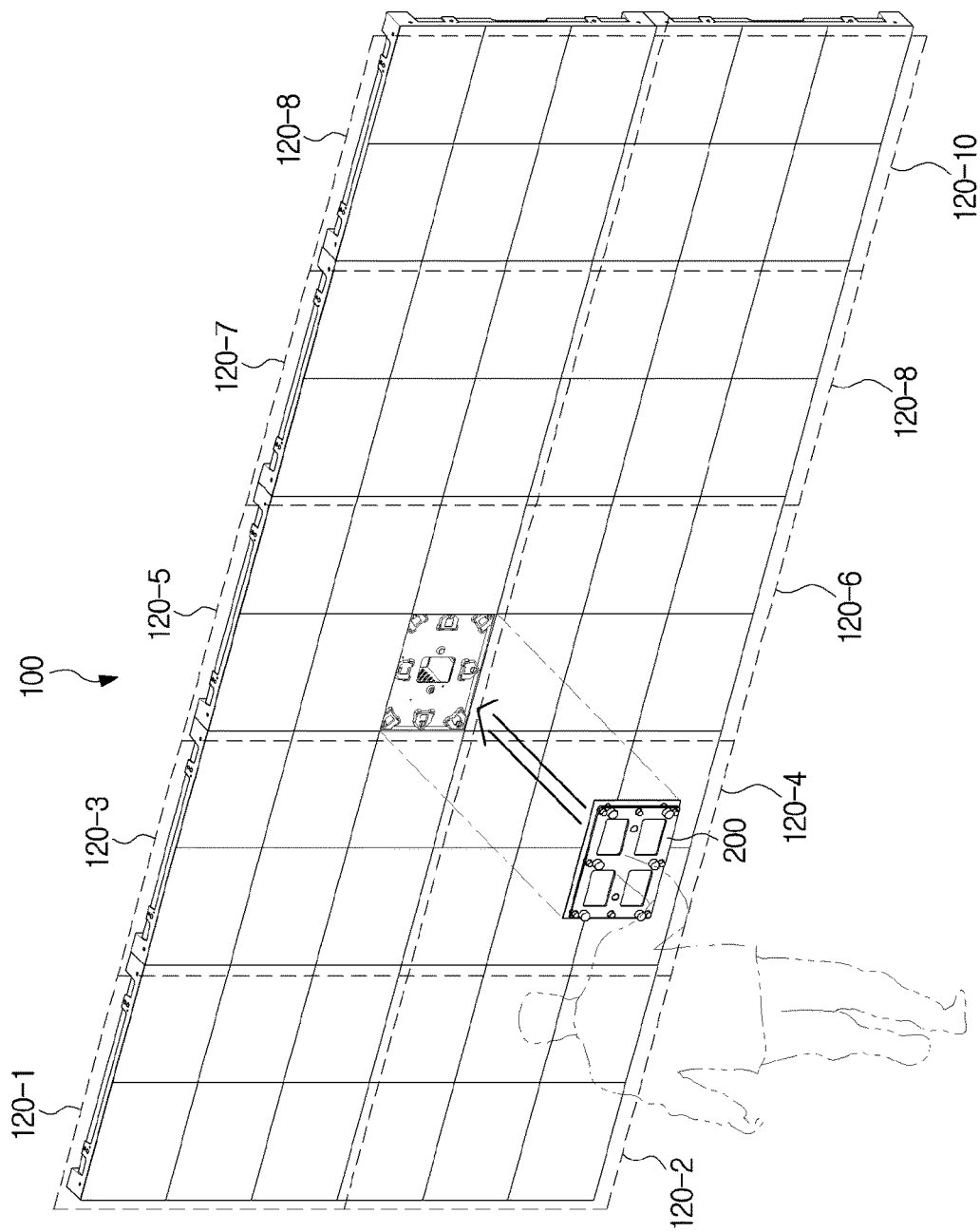
FIG. 13 is a schematic perspective view of an LED display device with a plurality of LED cabinets combined together, according to an exemplary embodiment.

The linkages 124 may link an LED cabinet, e.g., 120-3 to other LED cabinets (e.g., 120-1, 120-2, 120-4 to 120-10, see FIG. 13). Each linkage 124 is located on one corner (e.g., top-left, top-right, bottom-left, or bottom-right) with fastening members (e.g., bolts or rivets) as shown in FIG. 2B. However, the exemplary embodiment is not limited thereto and the linkages may be provided on different location on each LED cabinet 120.

The handle 125 may be used to transport, or to install the LED cabinet 120.

The LED display device 100 may include the plurality of LED panels 110 arranged in the form of a matrix, and the plurality of LED cabinets 120 including the plurality of LED panels 110. Alternatively, the LED display device 100 may include a single LED panel 110 and a single LED cabinet 120.

Referring to FIG. 3, an optical element 10a may be attached to the LED module 10 including the LEDs 11 and the circuit board 12.

The optical element 10a may make the light irradiated from the LEDs 11 to travel in a uniform direction or change (e.g., refract or reflect) the light. The optical element 10a may be, for example, an optical film or an optical lens film.

The optical element 10a may be made with acryl, polyethylene terephthalate (PET), resin, silicon, or highly transmittive and transparent material.

The cross-sectional shape of the optical element 10a (e.g., a round shape, a triangular shape, and/or edge-rounded triangular shape) may improve a fill factor. With the improved fill factor, an amount of light may be provided in a low light distributed area created by the gap between the LEDs 11. The provided amount of light may restrict occurrence of blur or moire effect.

The optical element 10a may increase luminance, which represents brightness per unit area of the LED 11. By comparison of the LED modules 10 with and without the optical element 10a, the luminance increased by the optical element 10a may be in a range from about 8% to about 30%.

The contrast ratio representing a difference between the brightest part and the darkest part in the LED module 10 may be enhanced by the optical element 10a. The contrast ratio enhanced by the optical element 10a may be in a range from about 7,500:1 to about 8,500:1.

The optical element 10a may be positioned to be in contact with the LED 11 of the LED module 10. For example, the optical element 10a may be positioned to contact the LED 11 of the LED module 10 by adhesion with e.g., an adhesive.

In another exemplary embodiment, another optical element may be positioned between the optical element 10a and the LED 11. For example, the other optical element may include one of a polarizing plate, an electromagnetic shield member, a protective film, and an anti-reflective film.

Referring to FIG. 4, the plurality of fastening members 13 protrude from the back face of the LED module 10 (e.g., protrude along the −y axis). The front face 13a of the fastening member 13 may have a flat form or a convexo-concave form.

The fastening member 13 may include a stud made of a material magnetizable by a magnet (e.g., steel or free-cutting steel). The fastening member 13 may be formed of any material that may be magnetizable and fixed to the LED module 10. A magnet may be embedded in the fastening member 13. In an exemplary embodiment, the fastening member 13 may be called a first fastening member.

The fastening member 13 may be positioned at each corner area (e.g., within 8 cm from a corner of the LED module 10) of the back face of the polygonal LED module 10. The number of the fastening members 13 may be greater than that of the corners of the LED module 10. The fastening members 13 may also be positioned in lines crossing center points of edges connecting the respective corners, i.e., lines passing through a center point of the LED module 10. The number of the fastening members 13 may be greater than that of the edges of the LED module 10.

There may be a guide member 14 located in a vicinity of the fastening members 13 in the back face of the LED module 10 for guiding the LED module 10 in a fastening direction. If the LED module 10 to be fastened to the front bracket 121 is fastened in a different direction, the guide member 14 may make it difficult for the LED module 10 to be installed on the front bracket 121.

The guide member 14 may be positioned so as not to overlap with the fastening members 13 on the back face of the LED module 10. Further, the guide member 14 may be positioned in a line passing through the center point of the LED module 10 as well.

The fastening member 13 and/or the guide member 14 may be fixed to the LED module 10 by e.g., soldering.

The cross-sectional shapes of the fastening member 13 and the guide member 14 may or may not be the same (e.g., along the −y axis). The cross-sectional shape of the fastening member 13 (e.g., along the −y axis) may have a rectangular shape (e.g., including an actually cylindrical, prismatic shape, etc.). The cross-sectional shape of the fastening member 13 may be tapered (e.g., in the direction of −y axis). In other words, the thickness of the cross-section of the fastening member 13 may be non-uniform. For example, the thicknesses of the center area and the edge area of the cross-section of the fastening member 13 may be different from each other.

Figure 5:
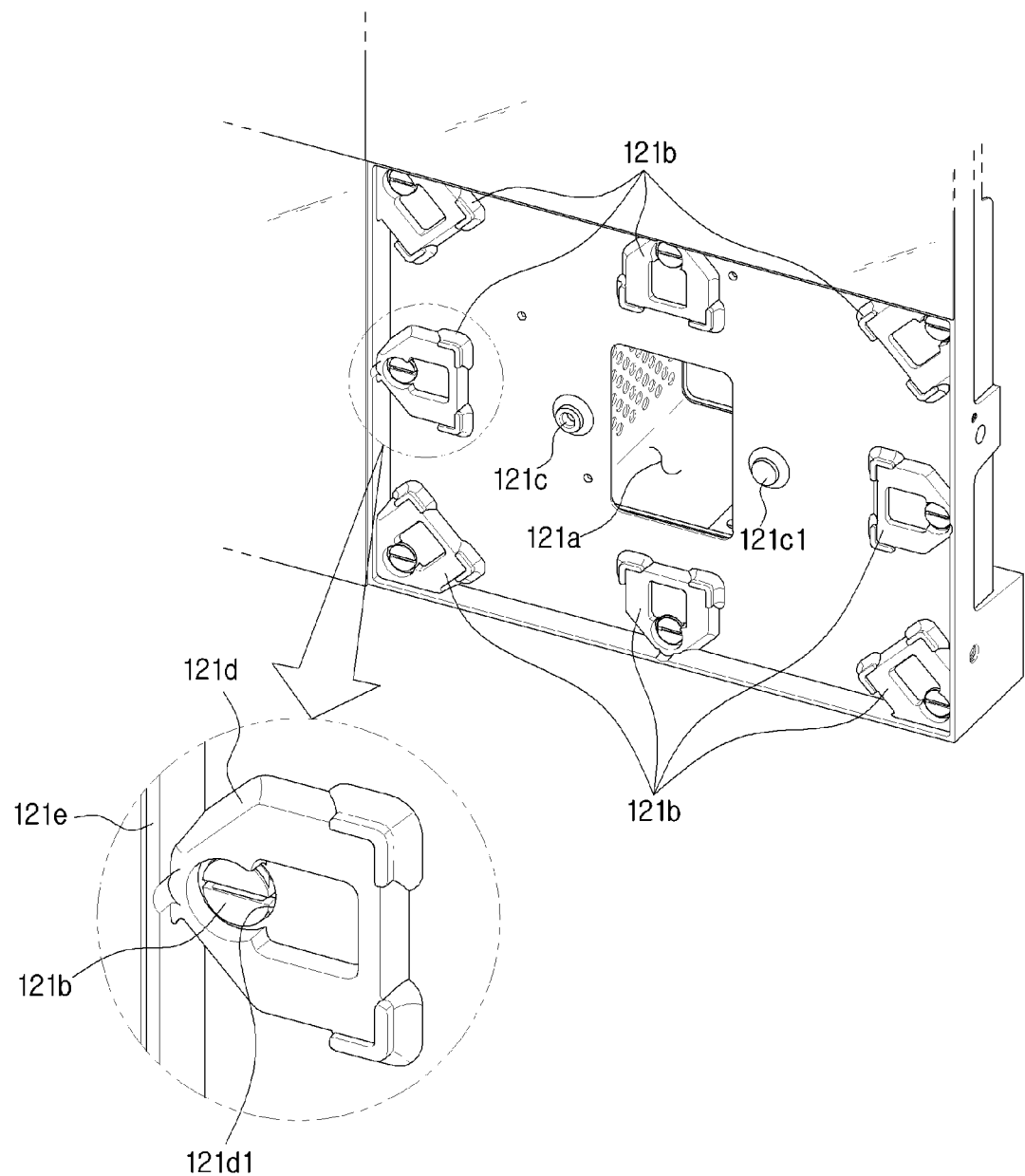
FIG. 5 is a schematic perspective view of a second fastening member of an LED display device, according to an exemplary embodiment.

FIG. 5 is a schematic perspective view of a second fastening member 121b of an LED display device 100, according to an exemplary embodiment.

Figure 6:
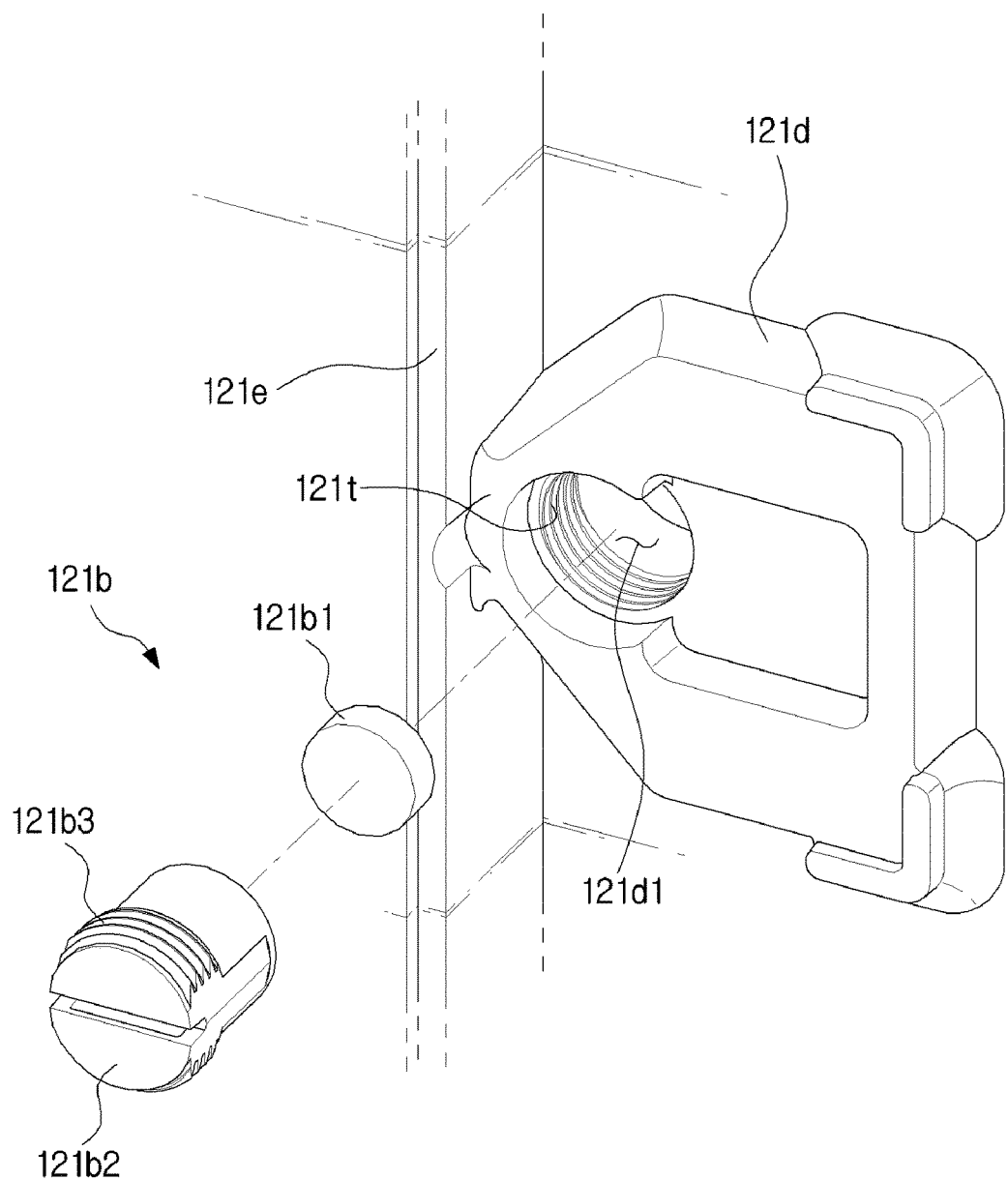
FIG. 6 is a schematic exploded view of a second fastening member of an LED display device, according to an exemplary embodiment.

FIG. 6 is a schematic exploded view of a second fastening member 121b of an LED display device 100, according to an exemplary embodiment.

Referring to FIGS. 5 and 6, a portion of the front bracket 121 corresponding to the LED module 10 (10-6 of FIG. 3) is shown. The front bracket 121 may be partitioned into a number of blocks corresponding to the number of the LED modules 10. For example, in a case that the LED modules 10 are arranged in 2×3, the front bracket 121 may be divided into 2×3 partitions.

Each partition may include a floor 121d and a top area 121e corresponding to the edges of the partitions. The height from the floor 121d to the top area 121e may be greater than the height (or thickness) of the first fastening member 13. The floor 121d may be formed by a cutting process.

Fastening members 121b corresponding to the fastening members 13 of the LED module 10 are located in the floor 121d of the front bracket 121. In other words, second fastening members 121b as many as the number of the first fastening members 13 provided on the LED module 10 may be located on the floor 121d of the front bracket 121. The second fastening members 121b may each include a magnet 121b1 and a screw cap 121b2.

The floor 121d of the front bracket 121 may include a groove 121d1 for accommodating the magnet 121b1. The magnet 121b1 may be positioned inside the groove 121d1 of the floor 121d of the front bracket 121. The second fastening member 121b may be fixed in the groove 121d1 of the floor 121d of the front bracket 121.

A plurality of grooves 121d1 may be formed to correspond to a number of the first fastening members 13. Threads 121t of a screw (e.g., corresponding to a female screw) may be formed in the groove 121d1. The groove 121d1 may be processed not to go through the front bracket 121. Specifically, the groove 121d1 may be processed not to go through the floor 121d of the front bracket 121.

The depth of the groove 121d1 may be thinner than the thickness of the floor 121d of the front bracket 121. Surface roughness of the groove 121d1 may not disturb the magnetic force moving the magnet 121b1 (e.g., along the +/−y axis).

Part of the floor of the groove 121d1 may go through the front bracket 121. For example, a part of the floor of the groove 121d1 (i.e., a groove with a smaller diameter than that of the groove 121d1) may go through the front bracket 121. The magnet 121b1 will not fall out of the part of the floor of the groove 121d1 (i.e., the groove with a smaller diameter than that of the groove 121d1).

The material of the screw cap 121b2 may include plastics, nonmagnetic metal (or alloy), or paramagnetic metal (or alloy).

The magnet 121b1 may be a permanent magnet. Alternatively, the magnet 121b1 may be a soft plastic magnet. The soft plastic magnet may also be called a rubber magnet. Alternatively, the magnet 121b1 may be a strongly magnetic neodymium magnet, or a ferrite magnet having weaker magnetic force than the neodymium magnet. The neodymium magnet or the ferrite magnet may be implemented in the form of a circle, ring (or donut), sphere, or hexahedron.

The magnet 121b1 may be implemented in the form of a circle, ring (donut), sphere, or hexahedron.

The thicker the magnet 121b1, the stronger the magnetic force (e.g., the unit of which is Tesla (T) or Gauss (G)) of the magnet 121b1 becomes. Furthermore, the larger the size of the magnet 121b1, the stronger the magnetic force of the magnet 121b1 becomes.

The strength of the magnets 121b1 of the plurality of second fastening members 121b corresponding to the plurality of first fastening members 13 of the LED module 10 may be about 3000G or less. Alternatively, the strength of the magnets 121b1 of the plurality of second fastening members 121b corresponding to the plurality of first fastening members 13 of the LED module 10 may be in a range from about 500G to about 5000G.

The magnet 121b1 may be modified in size and thickness according to the strength of magnetic force required for assembling the LED module 10 to the first bracket 121. In other words, the size and/or thickness of the magnet 121b1 may be modified to correspond to the strength of magnetization of the first fastening member 13.

The screw cap 121b2 with the magnet 121b1 received therein may be fixed by the screw threads 121t of the groove 121d1. The screw cap 121b2 may be fixed in the groove 121d1 by threads 121b3 of a screw (corresponding to e.g., a male screw) partly formed along the outer circumference of the screw cap 121b2. A linearly movable distance of the magnet 121b1 may be shorter than the length of the screw cap 121b2.

The magnet 121b1 may be moved back and forth in the groove 121d1 that has a depth corresponding to the polarity of the magnetized first fastening member 13. The magnet 121b1 may be linearly moved in the groove 121d1 that has a depth corresponding to the first fastening member 13.

The first fastening member 13 of the LED module 10, which is magnetized by the magnet, may be fixed by the magnet 121b1 inside the second fastening member 121b located on the floor of the front bracket 121. The first fastening member 13 of the LED module 10, which is magnetized by the magnet, may be fixed by the magnet 121b1 inside the second fastening member 121b.

There may be guide projections 121c and 121c1 corresponding to the guide member 14 on the floor 121d of the front bracket 121. If the LED module 10 to be fastened to the front bracket 121 is fastened in the fastening direction, the LED module 10 may be installed in the front bracket 121 by the first guide projection 121c with a groove to engage with the guide member 14. If the LED module 10 to be fastened to the front bracket 121 is fastened in a different direction, the second guide projection 121c1 without any groove to receive the guide member 14 may make it difficult for the LED module 10 to be installed in the front bracket 121.

In another exemplary embodiment of the present disclosure, the guide projection may only include the second guide projection 121c1.

Figure 7A:
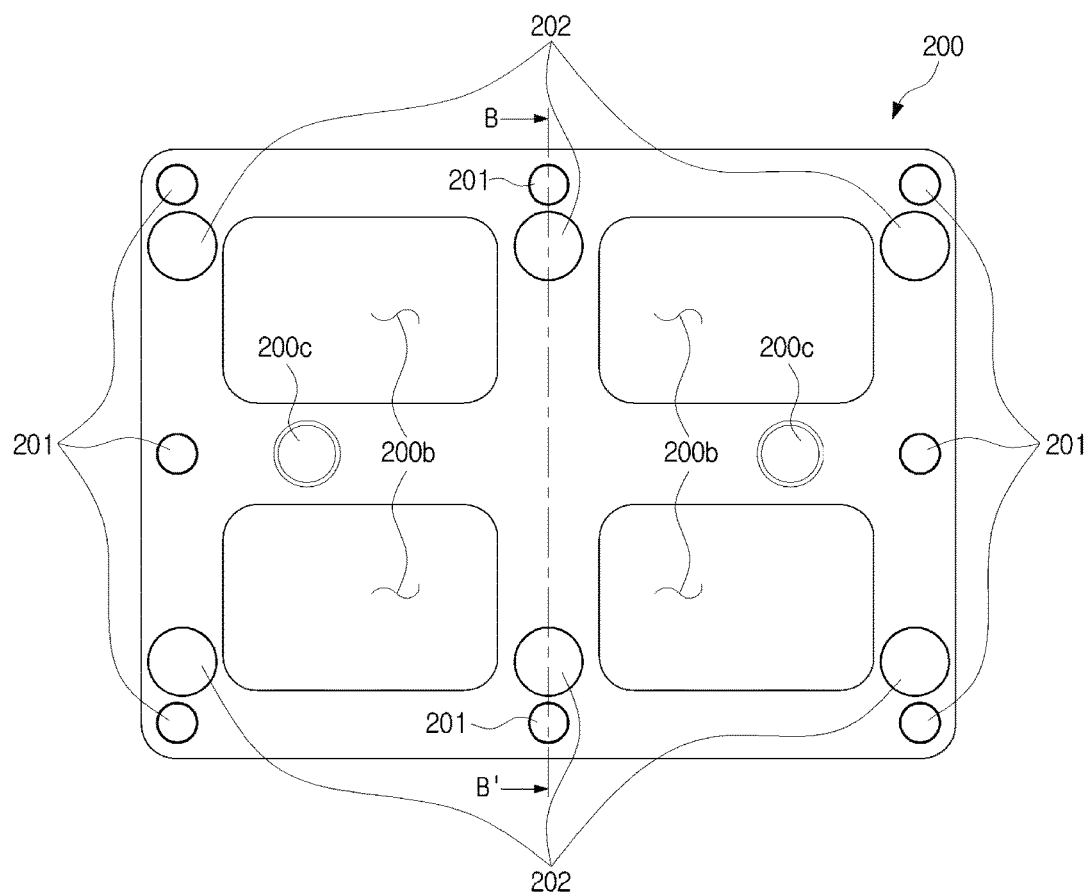
FIGS. 7A and 7B are a schematic cross-sectional view and a schematic perspective view, respectively, of a fastening jig, according to an exemplary embodiment.
Figure 7B:
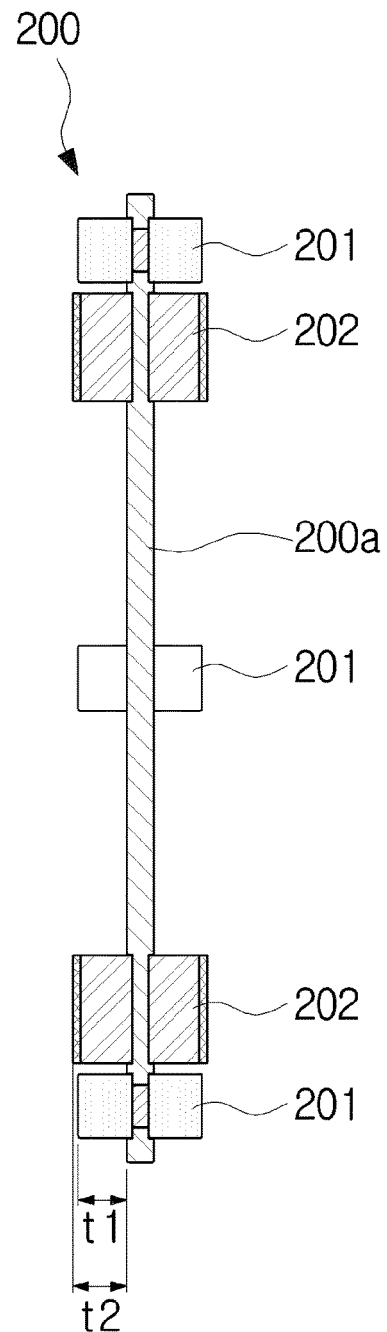

FIGS. 7A and 7B are a schematic cross-sectional view and schematic perspective view, respectively, of an assembly structure, according to an exemplary embodiment.

Referring to FIGS. 7A and 7B, an assembly structure includes a fastening jig 200. The fastening jig 200 may include a plate 200a with an opening 200b provided therein and a magnet 201. The fastening jig 200 may further include a shock absorbing member 202 located on one side of the magnet 201. The user may hold the fastening jig 200 by the opening 200b of the fastening jig 200.

There may be guides 200c located on both surfaces of the fastening jig 200 corresponding to the fastening direction of the LED module 10. The guides 200c may include text, images, or symbols. There may be a plurality of guides 200c. In FIG. 7A, the guides 200c represented on one face are symbols of 'O'. The guides represented on the other face may be symbols of 'X'.

The first fastening member 13 of the LED module 10 may be magnetized to correspond to the guides 200c of the fastening jig 200. For example, in the case that the guides 200c of the fastening jig 200 are 'O', the first fastening member 13 of the LED module 10 may be magnetized by attractive force to correspond to the polarity of the magnet of the second fastening member 121b. Furthermore, in the case that the guides 200c of the fastening jig 200 are 'X', the first fastening member 13 of the LED module 10 may be magnetized by repulsive force to correspond to the polarity of the magnet of the second fastening member 121b.

The size of the fastening jig 200 may be based on the size of the LED module 10. The size of the fastening jig 200 may be based on the position of the first fastening member 13 of the LED module 10 as well.

The magnetic force (the attractive force or the repulsive force) of the magnet 201 of the fastening jig 200 may help the LED module 10 and the front bracket 121 fastened to each other. Specifically, the magnetic force (the attractive force or the repulsive force) of the first fastening member 13 magnetized by the magnetic force of the magnet 201 of the fastening jig 200 may help the LED module 10 and the front bracket 121 fastened to each other.

The position of the magnet 201 may be based on the position of the first fastening member 13. The number of the magnets 201 may be more or fewer than that of the first fastening members 13.

The magnet 201 may be a permanent magnet. The magnet 201 may be implemented in a single magnet or multiple magnets. For example, there may be magnets located on both faces of the plate 200a (e.g., one magnet on the front face and the other on the rear face), or there may be only one magnet passing through the plate 200a.

The magnet 201 of the fastening jig 200 is substantially the same as the magnet 121b1 of the second fastening member 121b, so the description thereof will be omitted.

The shock absorbing member 202 may absorb shocks that may occur between the fastening jig 200 and the LED module 10. The material for the shock absorbing member 202 may include urethane, silicon, rubber, and/or any material that may prevent damage of the LEDs 11 mounted on the LED module 10. The shock absorbing member 202 may be implemented with a plurality of substances. The shock absorbing member 202 may be implemented by layering the same substances (e.g., 2 or more layers).

The number of the shock absorbing members 202 may be more or fewer than that of the magnets 201. The cross-sectional area of the shock absorbing member 202 may be larger than that of the magnet 201. Furthermore, the cross-sectional shape of the shock absorbing member 202 may or may not have the same shape (circular or elliptical shape) of the cross-section of the magnet 201.

In FIG. 7A, the height t1 of the magnet 201 based on the surface of the plate 200a may be different from the height t2 of the shock absorbing member 202. The height t2 of the shock absorbing member 202 may be higher than the height t1 of the magnet 201. For example, the height t2 of the shock absorbing member 202 may be about 10 mm and the height t1 of the magnet 201 may be about 9 mm. The height t2 of the shock absorbing member 202 and the height t1 of the magnet 201 may be by way of example, but the heights may have any values as long as the height t2 of the shock absorbing member 202 is higher than the height t1 of the magnet 201.

In another exemplary embodiment of the present disclosure, the magnet 201 of the fastening jig 200 may be implemented not only by the permanent magnet but by an electromagnet.

In the case that the magnet 201 of the fastening jig 200 is an electromagnet, the fastening jig 200 may further include a battery, and a switch to change the polarity of the electromagnet by changing the direction of current of the battery. The switch may include a toggle switch, e.g., a double pole double throw (DPDT).

The rest of the components of the fastening jig implemented with the electromagnet are substantially the same as those of the fastening jig 200 implemented with the permanent magnet, so the description thereof will be omitted.

The fastening jig implemented with the electromagnet may change the polarity of the electromagnet by switching operation of the switch. Unlike the fastening jig 200 implemented with the permanent magnet 201, the fastening jig implemented with the electromagnet may not need to make a change of direction (e.g., 'O' or 'X' of the guide 200c).

Figure 8:
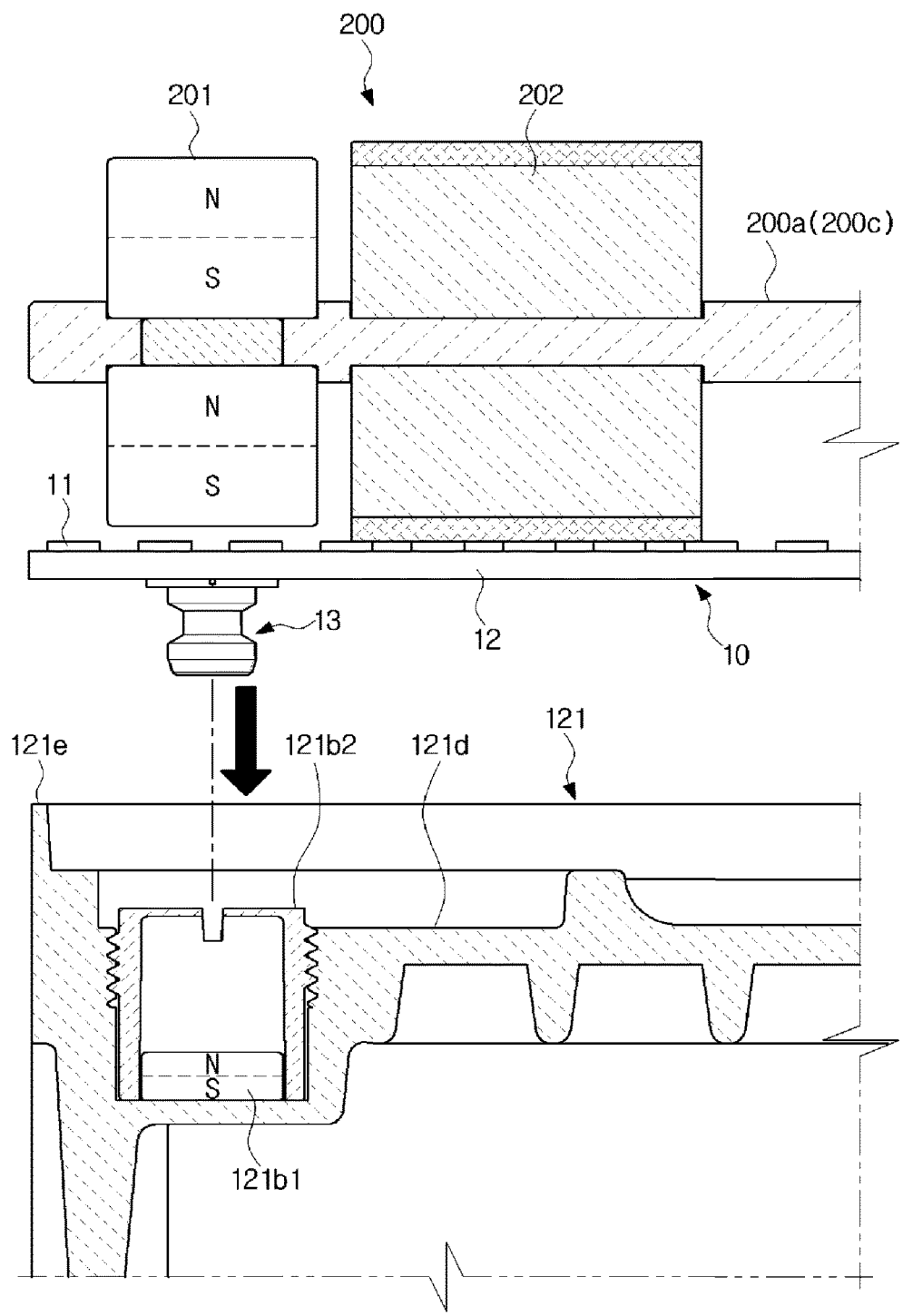
FIG. 8 is a schematic cross-sectional view of a fastening jig, an LED module, and a front bracket before the LED module and the front bracket are fastened (attached), according to an exemplary embodiment.

FIG. 8 is a schematic cross-sectional view of a fastening jig 200, an LED module 10, and a front bracket 121 before the LED module 10 and the front bracket 121 are fastened (attached), according to an exemplary embodiment.

Figure 9:
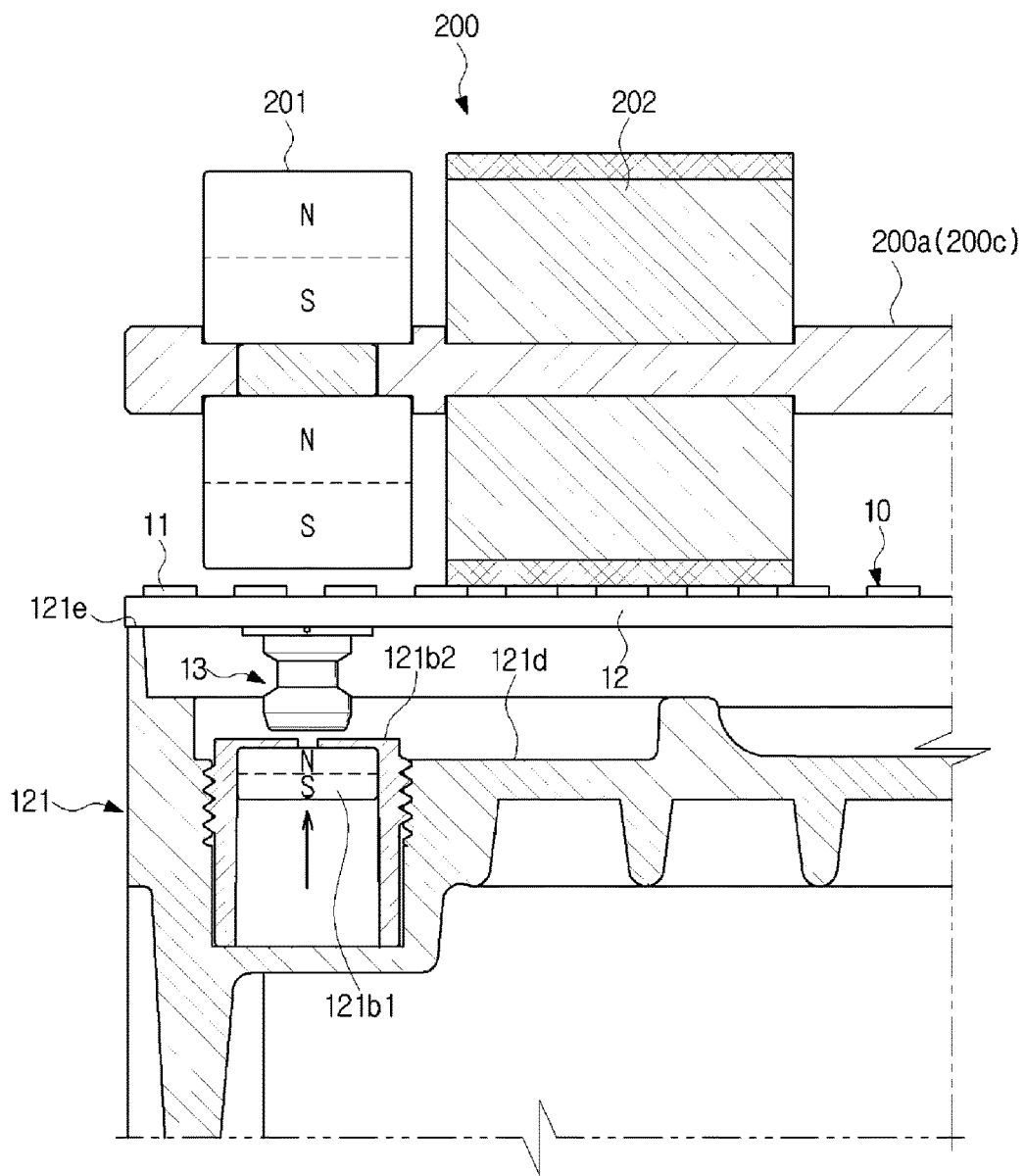
FIG. 9 is a schematic cross-sectional view of a fastening jig, an LED module, and a front bracket after the LED module and the front bracket are fastened, according to an exemplary embodiment.

FIG. 9 is a schematic cross-sectional view of a fastening jig 200, an LED module 10, and a front bracket 121 after the LED module 10 and the front bracket 121 are fastened, according to an exemplary embodiment.

Figure 10:
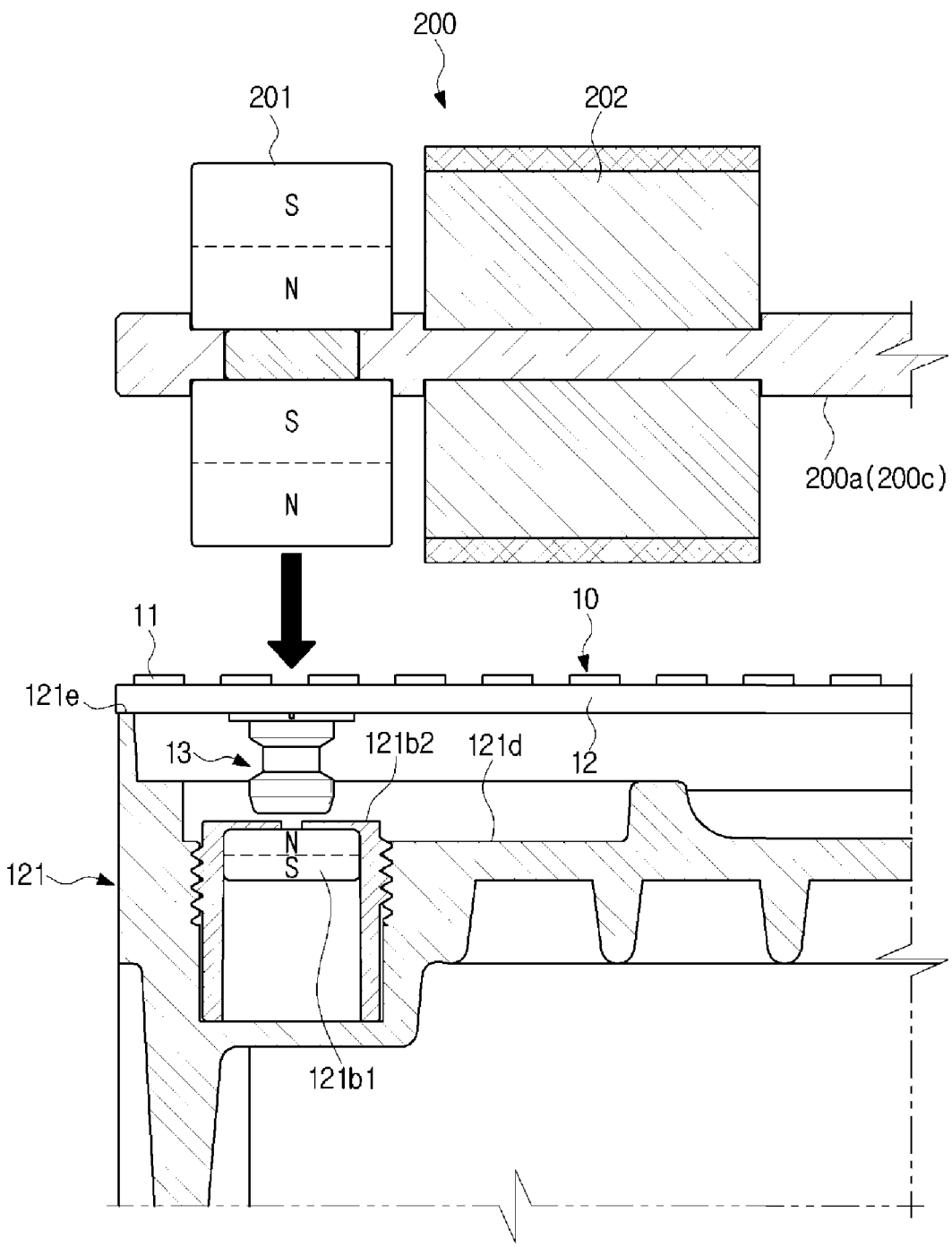
FIG. 10 is a schematic cross-sectional view of a fastening jig separated from a fastened LED module and front bracket, according to an exemplary embodiment.

FIG. 10 is a schematic cross-sectional view of a fastening jig 200 separated from a fastened LED module 10 and front bracket 121, according to an exemplary embodiment.

Figure 11:
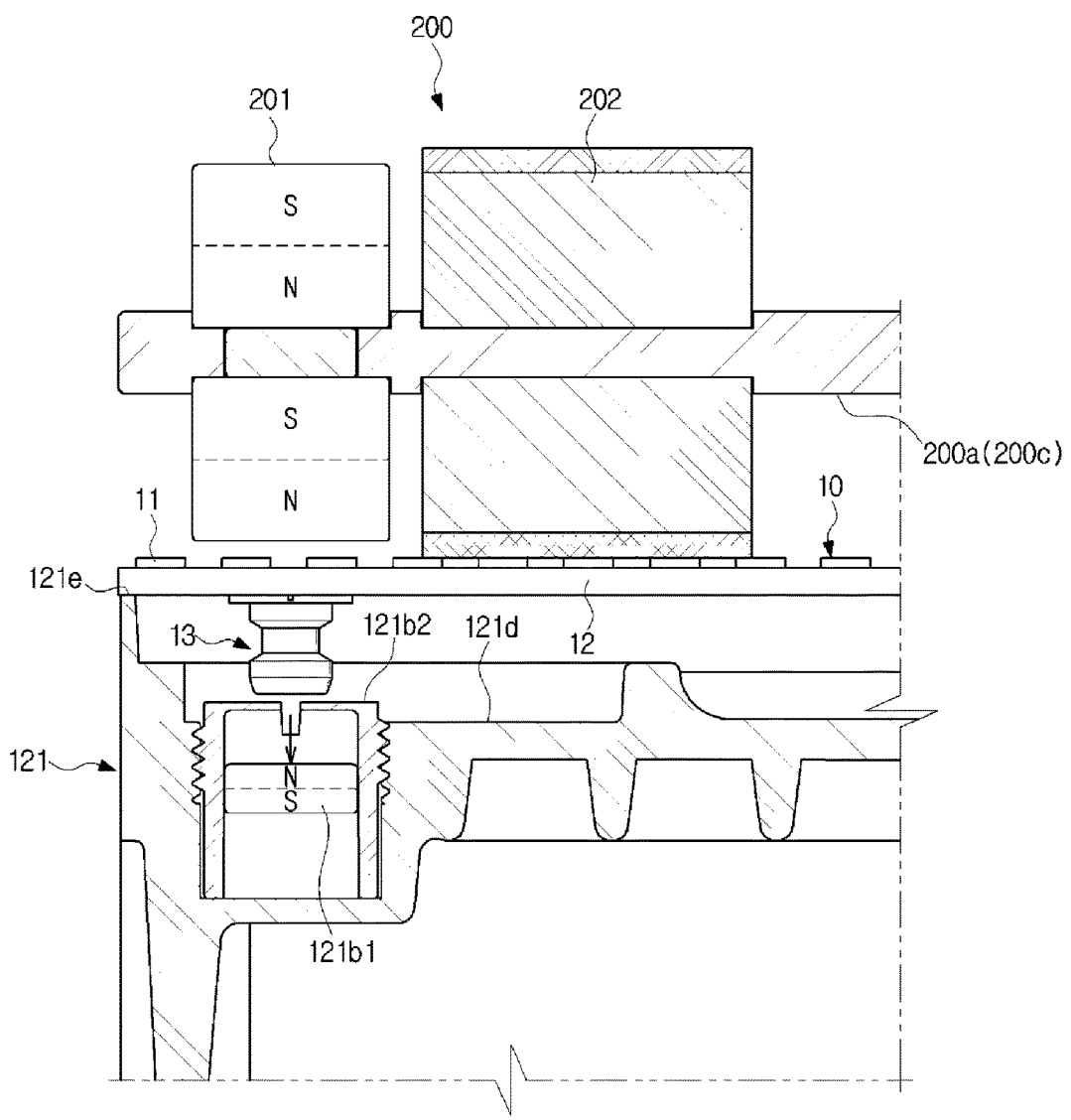
FIG. 11 is a schematic cross-sectional view of a fastening jig, an LED module, and a front bracket before the LED module and the front bracket are detached (separated), according to an exemplary embodiment.

FIG. 11 is a schematic cross-sectional view of a fastening jig 200, an LED module 10, and a front bracket 121 before they are detached (separated), according to an embodiment of the present disclosure.

Figure 12:
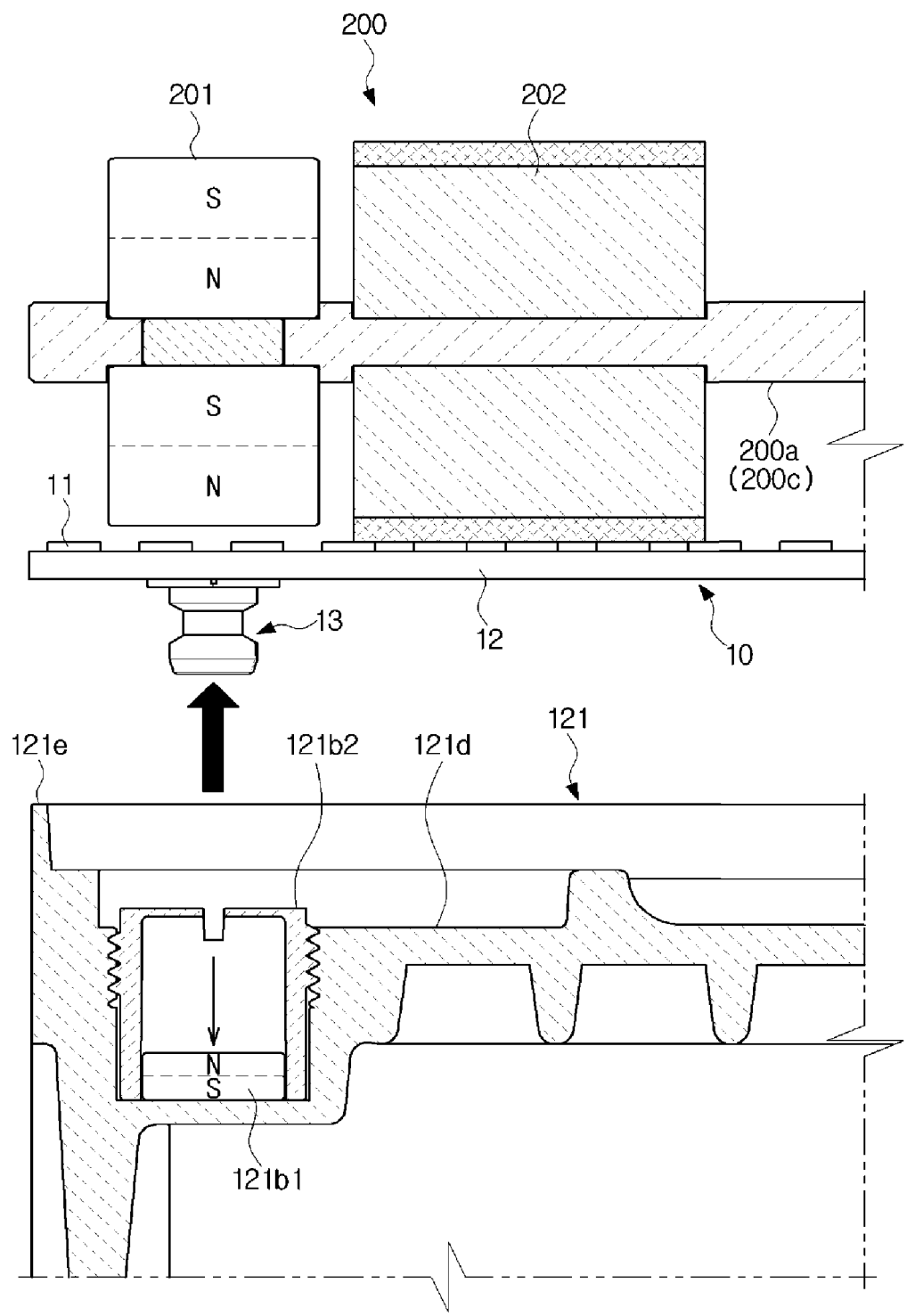
FIG. 12 is a schematic cross-sectional view of a fastening jig, an LED module, and a front bracket after the LED module and the front bracket are detached (separated), according to an exemplary embodiment.

FIG. 12 is a schematic cross-sectional view of a fastening jig 200, an LED module 10, and a front bracket 121 after they are detached, according to an exemplary embodiment.

Referring to FIG. 8, the user may fasten (attach) the LED module 10 to the front bracket 121 using the fastening jig 200.

To fasten the LED module 10 to the front bracket 121, the user may hold the fastening jig 200 taking into account a direction (e.g., the direction of 'O') of the guide 200c.

Using the magnetic force of the magnet 201 of the fastening jig 200, the fastening jig 200 and the LED module 10 are combined first.

Once the fastening jig 200 and the LED module 10 are combined by the magnetic force, the first fastening member 13 of the LED module 10 is magnetized by the magnet 201 of the fastening jig 200. In FIG. 8, the first fastening member 13 of the LED module 10 is magnetized to N-pole.

If the fastening jig 200 and the LED module 10 are combined by the magnetic force, the shock absorbing member 202 of the fastening jig 200 may come into contact with the LEDs 11 of the LED module 10 or the optical element 10a. If the fastening jig 200 and the LED module 10 are combined by the magnetic force, the magnet 201 may not contact the LEDs 11 of the LED module 10 or the optical element 10a because of the difference in height between the shock absorbing member 202 and the magnet 201.

The non-contact between the magnet 201 and the LED module 10 may prevent the LED module 10 or the LEDs 11 from being damaged by the fastening jig 200. Furthermore, the non-contact between the magnet 201 and the LED module 10 may prevent the LED module 10 or the LEDs 11 from being damaged by the magnet 201.

The combined fastening jig 200 and LED module 10 may be sufficiently separated from the front bracket 121. If there is no attractive force applied between the first fastening member 13 of the LED module 10 magnetized to N-pole and the S-pole of the magnet 121b1 of the front bracket 121, the magnet 121b1 of the front bracket 121 remains in the current state (i.e., fixed).

The combined fastening jig 200 and LED module 10 may approach the magnet 121b1 of the front bracket 121 by the user.

Referring to FIG. 9, the fastening jig 200, LED module 10, and front bracket 121 are in a state of being fastened together. The first fastening member 13 of the LED module 10 magnetized to S-pole is fastened to the N-polarized magnet 121b1 of the front bracket 121 by attractive force.

In the case that the combined fastening jig 200 and LED module 100 are approaching toward the magnet 121b1 of the front bracket 121 by the user, the first fastening member 13 of the LED module 10 magnetized to N-pole is fastened to the S-polarized magnet 121b1 of the front bracket 121 by attractive force.

If the fastening jig 200 and LED module 100 are approaching closer to the magnet 121b1 of the front bracket 121 by the user, the magnet 121b1 may be moved upward (e.g., in the direction of the y axis) by the attractive force strengthened more than the magnetic force in the embodiment of FIG. 8 between the first fastening member 13 of the LED module 10 and the magnet 121b1 of the front bracket 121.

In the case that the fastening jig 200 and LED module 100 are approaching the front bracket 121 by the user, the first fastening member 13 of the LED module 10 and the magnet 121b1 of the front bracket 121 may be aligned by the strengthened attractive force. In the case that the fastening jig 200 and LED module 100 are gradually approaching the magnet 121b1 of the front bracket 121 by the user, the first fastening member 13 of the LED module 10 may be guided to the magnet 121b1 of the front bracket 121 by the strengthened attractive force.

When the fastening jig 200 and the LED module 10 are gradually approaching the front bracket 121 by the user, the moving speed of the magnet 121b1 may get faster due to the strengthened attractive force.

Before the first fastening member 13 of the LED module 10 and the magnet 121b1 of the front bracket 121 approach each other as close as possible, the movement of the magnet 121b1 due to the strengthened attractive force is stopped. Before the rear face of the LED module 10 and the top area 121e of the front bracket 121 come into contact with each other, the movement of the magnet 121b1 due to the strengthened attractive force is stopped by the screw cap 121b2.

If the rear face of the LED module 10 and the top area 121e of the front bracket 121 make contact with each other, the maximum attractive force may be applied between the first fastening member 13 of the LED module 10 and the magnet 121b1 of the front bracket 121.

While the rear face of the LED module 10 and the top area 121e of the front bracket 121 come into contact with each other, the first fastening member 13 of the LED module 10 and the magnet 121b1 of the front bracket 121 may not be in contact with each other. For example, the gap between the first fastening member 13 of the LED module 10 and the magnet 121b1 of the front bracket 121 may be about 1.5 mm or less. Alternatively, the gap between the first fastening member 13 of the LED module 10 and the magnet 121b1 of the front bracket 121 may be in a range from about 0.1 mm to about 3.5 mm.

While the rear face of the LED module 10 and the top area 121e of the front bracket 121 make contact with each other, the first fastening member 13 of the LED module 10 and the magnet 121b1 of the front bracket 121, to which the maximum attractive force is applied, may not be in contact with each other. While the rear face of the LED module 10 and the top area 121e of the front bracket 121 make contact with each other, the non-contact between the first fastening member 13 of the LED module 10 and the magnet 121b1 of the front bracket 121, to which the maximum attractive force is applied, may prevent the screw cap 121b2 of the front bracket 121 from being damaged by the first fastening member 13.

If the magnetic force of the magnet 121b1 of the front bracket 121 is greater than that of the magnet 201 of the fastening jig 200, the fastening jig 200 may be separated from the LED module 10. In other words, since the magnetic force of the magnet 121b1 of the front bracket 121 is greater than that of the magnet 201 of the fastening jig 200 that magnetizes the first fastening member 13, the fastening jig 200 may be separated from the LED module 10.

Referring to FIG. 10, the user may separate (detach) the LED module 10 from the front bracket 121 using the fastening jig 200 held by the user.

To detach the LED module 10 from the front bracket 121, the user may hold the fastening jig 200 taking into account a direction (e.g., the direction of 'X') of the guide 200c. In FIG. 10, the guide direction of the fastening jig 200 is the opposite to the guide direction of the fastening jig 200 in FIG. 8.

Using the magnetic force of the magnet 201 of the fastening jig 200, the fastening jig 200 and the LED module 10 are combined first.

Once the fastening jig 200 and the LED module 10 are combined by the magnetic force, the first fastening member 13 of the LED module 10 is magnetized by the magnet 201 of the fastening jig 200. In FIG. 10, the first fastening member 13 of the LED module 10 is magnetized to S-pole.

Combination of the fastening jig 200 and the LED module 10 in FIG. 10 using the magnetic force of the magnet 201 of the fastening jig 200 is substantially the same as that of the fastening jig 200 and the LED module 10 in the exemplary embodiment of FIG. 8, which uses the magnetic force of the magnet 201 of the fastening jig 200 (except for the difference in magnetized pole), so the overlapping description will be omitted.

Referring to FIG. 11, the LED module 10 combined with the fastening jig 200 is in a state of being separated from the front bracket 121. The first fastening member 13 of the LED module 10 magnetized to N-pole is separated from the N-polarized magnet 121b1 of the front bracket 121 by repulsive force.

If the combined fastening jig 200 and LED module 100 are approaching the magnet 121b1 of the front bracket 121 by the user, the first fastening member 13 of the LED module 10 magnetized to S-pole is separated from the S-polarized magnet 121b1 of the front bracket 121 by the repulsive force.

If the fastening jig 200 and LED module 100 are approaching closer to the magnet 121b1 of the front bracket 121 by the user, the magnet 121b1 may be moved downward (e.g., in the direction of the −y axis) by the repulsive force strengthened more than the magnetic force in the embodiment of FIG. 10 between the first fastening member 13 of the LED module 10 and the magnet 121b1 of the front bracket 121.

In the case that the fastening jig 200 and LED module 100 are approaching the front bracket 121 by the user, the first fastening member 13 of the LED module 10 and the magnet 121b1 of the front bracket 121 may not be aligned by the strengthened repulsive force. While the fastening jig 200 and LED module 100 are gradually approaching the magnet 121b1 of the front bracket 121 by the user, the first fastening member 13 of the LED module 10 is pushed back from the magnet 121b1 of the front bracket 121 by the strengthened repulsive force.

While the fastening jig 200 and the LED module 10 are gradually approaching the front bracket 121 by the user, the moving speed of the magnet 121b1 may get faster due to the strengthened repulsive force (or repulsive force and gravity).

Before the first fastening member 13 of the LED module 10 and the magnet 121b1 of the front bracket 121 approach each other as close as possible, the movement of the magnet 121b1 due to the strengthened repulsive force is stopped. Before the rear face of the LED module 10 and the top area 121e of the front bracket 121 come into contact with each other, the movement of the magnet 121b1 due to the strengthened repulsive force may be stopped at the bottom of the groove 121d1. Alternatively, before the rear face of the LED module 10 and the top area 121e of the front bracket 121 come into contact with each other, the movement of the magnet 121b1 due to the strengthened repulsive force may be stopped by the screw cap 121b2.

If the rear face of the LED module 10 and the top area 121e of the front bracket 121 make contact with each other, the maximum repulsive force may be applied between the first fastening member 13 of the LED module 10 and the magnet 121b1 of the front bracket 121.

While the rear face of the LED module 10 and the top area 121e of the front bracket 121 come into contact with each other, the first fastening member 13 of the LED module 10 and the magnet 121b1 of the front bracket 121 may not be in contact with each other. For example, the gap between the first fastening member 13 of the LED module 10 and the magnet 121b1 of the front bracket 121 may be about 1.5 mm or less. Alternatively, the gap between the first fastening member 13 of the LED module 10 and the magnet 121b1 of the front bracket 121 may be in a range from about 0.1 mm to about 3.5 mm.

While the rear face of the LED module 10 and the top area 121e of the front bracket 121 make contact with each other, the first fastening member 13 of the LED module 10 and the magnet 121b1 of the front bracket 121, to which the maximum attractive force is applied, may not be in contact with each other. While the rear face of the LED module 10 and the top area 121e of the front bracket 121 make contact with each other, the non-contact between the first fastening member 13 of the LED module 10 and the magnet 121b1 of the front bracket 121, to which the maximum attractive force is applied, may prevent the screw cap 121b2 of the front bracket 121 from being damaged by the first fastening member 13.

The LED module 10 may be separated from the front bracket 121 by the repulsive force between the magnet 121b1 of the front bracket 121 and the magnet 201 of the fastening jig 200.

Referring to FIG. 12, the user may separate (detach) the LED module 10 from the front bracket 121 using the fastening jig 200 held by the user.

The first fastening member 13 of the LED module 10 magnetized to N-pole may be separated (detached) from the magnet 121b1 of the front bracket 121 by repulsive force. The LED module 10 separated from the front bracket 121 may be combined with the front bracket 121 in the procedures of FIGS. 8 and 9.

FIG. 13 is a schematic perspective view of an LED device with a plurality of LED cabinets combined together, according to an exemplary embodiment.

Referring to FIG. 13, an LED display device 100 is shown, in which a plurality of LED cabinets 120-1 to 120-10 are combined together. The LED display device 100 may include the plurality of LED cabinets 120 (i.e., 120-1 to 120-10).

The plurality of LED cabinets 120 may be coupled in the form of a matrix (e.g., S×T, where S and T are integers). The matrix may be a square matrix (e.g., 2×2 matrix, 3×3 matrix, etc., i.e., S=T, where S and T are integers), or a rectangular matrix (i.e., S≠T). The plurality of LED cabinets (120-1 to 120-10) may be interconnected by the linkages 124 and fastening members (e.g., bolts or rivets).

If one LED module 10 needs to be separated from the LED panel 110 of the LED cabinet 120, the user may separate the LED module 10 from the front bracket 121 using magnetic force (attractive or repulsive force) of the fastening jig 200. Furthermore, if the LEDs 11 of one LED module 10 in the LED panel 110 need post management, the user may separate the LED module 10 from the front bracket 121 using the magnetic force (attractive or repulsive force) of the fastening jig 200.

A timing controller for the plurality of LED cabinets 120-1 to 120-10 may generate and send video (or image) data corresponding to a video (or image) received from an external control device and control signals to the LEDs 11 in the LED panel 110.

The LED display device 100 may display content (e.g., video or image) by driving the LEDs 11 on the LED panel 110 of the plurality of LED cabinets 120-1 to 120-10.

The external control device may transmit video data corresponding to content and control signals to the LED panel 110 of the plurality of LED cabinets 120-1 to 120-10 one by one. Alternatively, the external control device may transmit video data corresponding to content and control signals to the LED panel 110 of the plurality of LED cabinets 120-1 to 120-10 at a time.

Exemplary embodiments provide an LED display device and an assembly structure for assembling the same, by which an LED module and a front bracket may be fastened by magnetic force (e.g., attractive force).

Exemplary embodiments provide an LED display device and an assembly structure for assembling the same, by which an LED module and a front bracket may be separated by magnetic force (e.g., repulsive force), Exemplary embodiments provide an LED display device and an assembly structure for assembling the same, by which an LED module and a front bracket may be fastened by attractive force applied between a first fastening member located on the rear face of the magnetized LED module and a second fastening member of the front bracket.

Exemplary embodiments provide an LED display device and an assembly structure for assembling the same, by which an LED module and a front bracket may be separated by repulsive force applied between a first fastening member located on the rear face of the magnetized LED module and a second fastening member of the front bracket.

Exemplary embodiments provide an LED display device and an assembly structure for assembling the same, by which an LED module and a front bracket may be separated by magnetic force, thereby improving the after-service quality.

Exemplary embodiments provide an LED display device and an assembly structure for assembling the same, by which an LED module and a front bracket may be fastened by magnetic force, thereby reducing assembly time.

Exemplary embodiments are not limited thereto, but may provide an LED display device and structure of assembling the same, by which an LED module and a front bracket may be fastened by magnetic force.

Although the present disclosure is described with reference to some embodiments as described above and accompanying drawings, it will be apparent to those ordinary skilled in the art that various modifications and changes can be made to the embodiments. For example, the aforementioned method may be performed in different order, and/or the aforementioned systems, structures, devices, circuits, etc., may be combined in different combinations from what is described above, and/or replaced or substituted by other components or equivalents thereof, to obtain appropriate results.

Thus, it will be apparent to those ordinary skilled in the art that the invention is not limited to the embodiments described but is defined by the following claims and equivalents to the claims.

What is claimed is:

1. A display device comprising:
    a light emitting diode (LED) module comprising:
        a circuit board;
        a plurality of LEDs mounted on the circuit board; and
        at least one first fastening member provided on the circuit board, the at least one first fastening member configured to be magnetized to one of an N-pole or an S-pole; and
    a bracket configured to accommodate the LED module and comprising at least one second fastening member, the at least one first fastening member and the at least one second fastening member for being fastened to each other by a magnetic force,
    wherein the at least one second fastening member comprises a magnet configured to move linearly in response to the at least one first fastening member being magnetized to the one of the N-pole or the S-pole.

2. The display device of claim 1, wherein the at least one first fastening member comprises a plurality of first fastening members.

3. The display device of claim 2, wherein the plurality of first fastening members are located in corner areas of the LED module, and a number of the plurality of first fastening members is greater than a number of corners of the LED module.

4. The display device of claim 3, wherein the number of the plurality of first fastening members is greater than a number of edges of the LED module.

5. The display device of claim 2, wherein the LED module further comprises a guide member provided on the LED module and configured to guide the LED module in a fastening direction, and
    wherein the guide member is spaced apart from the at least one first fastening member.

6. The display device of claim 2, wherein at least two first fastening members of the plurality of first fastening members are located along a virtual line that passes through a center point of the LED module.

7. The display device of claim 1, wherein the at least one second fastening member further comprises a screw cap screwed in a groove formed in the bracket and configured to accommodate the magnet, and
    wherein the magnet is configured to move linearly within the screw cap in response to the at least one first fastening member being magnetized with the one of the N-pole or the S-pole.

8. The display device of claim 7, wherein a distance of linear movement of the magnet inside the screw cap is shorter than a length of the screw cap in a movement direction of the magnet.

9. The display device of claim 5, wherein the bracket further comprises a guide projection provided on the bracket at a location corresponding to a location of the guide member provided on the LED module.

10. The display device of claim 1, wherein in response to attractive force being applied between the at least one first fastening member and the at least one second fastening member, the LED module is fastened to the bracket, and
    wherein in response to repulsive force being applied between the at least one first fastening member and the at least one second fastening member, the LED module is separable from the bracket.

11. The display device of claim 1, wherein the at least one first fastening member and the at least one second fastening member are not in contact with each other when the LED module and the bracket are fastened to each other.

12. The display device of claim 1 further comprising an optical element provided on the LED module.

13. The display device of claim 1 further comprising a cover frame attached to the bracket, and
    wherein the cover frame is configured to accommodate a control board configured to provide driving signals to drive the plurality of LEDs and a power supply configured to supply power to the plurality of LEDs.

14. A display device comprising:
    a light emitting diode (LED) module comprising a plurality of first fastening members provided at a rear face of the LED module, the plurality of first fastening members configured to be magnetized to one of an N-pole or an S-pole; and
    a bracket configured to accommodate the LED module therein, the bracket comprising a plurality of magnets provided at a front face the bracket at locations corresponding to locations of the plurality of first fastening members provided at the rear face of the LED module,
    wherein the LED module and the bracket are fastened by a magnetic force between the plurality of first fastening members and the plurality of magnets, the magnetic force being generated in response to the plurality of first fastening members being magnetized to the one of the N-pole or the S-pole.

15. The display device of claim 14, wherein the bracket comprises a plurality of second fastening members housing the plurality of magnets so the plurality of magnets move linearly within the plurality of second fastening members according to the magnetic force.

16. The display device of claim 14, wherein the bracket further comprises a plurality of screw caps, each of the plurality of screw caps accommodating a magnet of the plurality of magnets, a screw cap of the plurality of screw caps screwed in a groove formed in the bracket,
    wherein the magnet is configured to move linearly within the screw cap in response to the plurality of first fastening members being magnetized with the one of the N-pole or the S-pole.

* * * * *